(12) United States Patent
Amano et al.

(10) Patent No.: US 6,222,967 B1
(45) Date of Patent: *Apr. 24, 2001

(54) PACKAGING PLATFORM, OPTICAL MODULE USING THE PLATFORM, AND METHODS FOR PRODUCING THE PLATFORM AND THE MODULE

(75) Inventors: Michiyuki Amano; Shunichi Tono; Hirotsugu Sato; Yasuaki Tamura; Yoshito Shuto; Kenji Yokoyama; Haruki Kozawaguchi; Makoto Hikita; Ryoko Yoshimura; Satoru Tomaru; Saburo Imamura; Toshikazu Hashimoto; Yasufumi Yamada; Kuniharu Kato; Masahiro Yanagisawa; Akio Sugita, all of Tokyo (JP)

(73) Assignee: Nippon Telegraph and Telephone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,598

(22) Filed: Mar. 13, 1998

(30) Foreign Application Priority Data

Mar. 13, 1997 (JP) .................................................. 9-058876
Jul. 24, 1997 (JP) .................................................. 9-198083
Feb. 9, 1998 (JP) .................................................. 10-027558

(51) Int. Cl.[7] ...................................................... G02B 6/36
(52) U.S. Cl. ................................. 385/49; 385/88; 385/92
(58) Field of Search .................................... 385/49, 88, 90, 385/92, 91, 89

(56) References Cited

U.S. PATENT DOCUMENTS 3,974,122 * 8/1976 Sato et al. ........................ 260/37 SB
4,286,838 * 9/1981 Huignard et al. ...................... 385/88

(List continued on next page.)

FOREIGN PATENT DOCUMENTS 42 17 553    12/1993  (DE) .
19547941      7/1996  (DE) .

(List continued on next page.)

OTHER PUBLICATIONS

Michael J. Wale et al., "Self–Aligned Flip–Assembly of Photonic Devices with Electrical and Optical Connections", Dec. 1990, pp. 780–786.

Kentaro Kondo et al., "Rf–Crosstalk of a Photodiode Array and a Subcarier Under High–Impedance Condition", 1994, pp. 4–294.

(List continued on next page.)

Primary Examiner—Rodney Bovernick
Assistant Examiner—Ellen E. Kim
(74) Attorney, Agent, or Firm—Venable; Robert J. Frank

(57) ABSTRACT

A packaging platform for optically coupling one or more optical waveguides of one or more optical components having the optical waveguide to one or more optical fibers is provided with a reference structure portion for the horizontal and vertical positioning of the optical component. The platform is further provided with one or more fiber positioning portions for inserting and holding the optical fiber and positioning the optical fiber at a position where the optical fiber is optically connected to the optical waveguide. The provided packaging platform and an optical module using the platform can simplify all alignment steps for optical coupling, electrical connection and sealing in the coupling of the optical component and the optical fiber.

23 Claims, 33 Drawing Sheets

U.S. PATENT DOCUMENTS

| | | | |
|---|---|---|---|
| 4,820,761 | 4/1989 | Saito et al. | 524/456 |
| 5,488,678 | 1/1996 | Taneya et al. | 385/14 |
| 5,555,331 | 9/1996 | Billet et al. | 385/49 |
| 5,748,822 * | 5/1998 | Miura et al. | 385/90 |

FOREIGN PATENT DOCUMENTS

| | | |
|---|---|---|
| 0 466 134 | 1/1992 | (EP) . |
| 0 532 470 | 3/1993 | (EP) . |
| 0 723 171 | 7/1996 | (EP) . |
| 60-038464 | 2/1985 | (JP) . |
| 63-278004 | 11/1988 | (JP) . |
| 6-118262 | 4/1994 | (JP) . |
| 09054227 | 2/1997 | (JP) . |
| 9-054227 | 2/1997 | (JP) . |
| 9-152522 | 6/1997 | (JP) . |

OTHER PUBLICATIONS

Gohji Nakagawa et al., "Automatic Assembly Architecture for Passive–aligned Laser–diode Module", 1995, pp. 187.

Kazunori Miura et al., "Semiconductor Laser Array Module Hybrid–mounted integrally on Si Substrate", Dec. 1994, pp. 91–96.

Seimi Sasaki et al., "Silicon Packaged Laser Diode Module", 1995, pp. 185.

S. Mizuta et al., "Study on Designing of Fiber Self–alignment Mounting Structure", 1995, pp. 213.

Toshio Kato et al., "Optical Coupling Module Using Micro Optical Bench (MOB)", 1997, pp. 197.

"Hybrid Integration of Semiconductor Lasers with Si–Based Single–Mode Ridge Waveguides" Friedrich et al. 8217 Journal of Lightwave Technology, Mar. 1992.

* cited by examiner

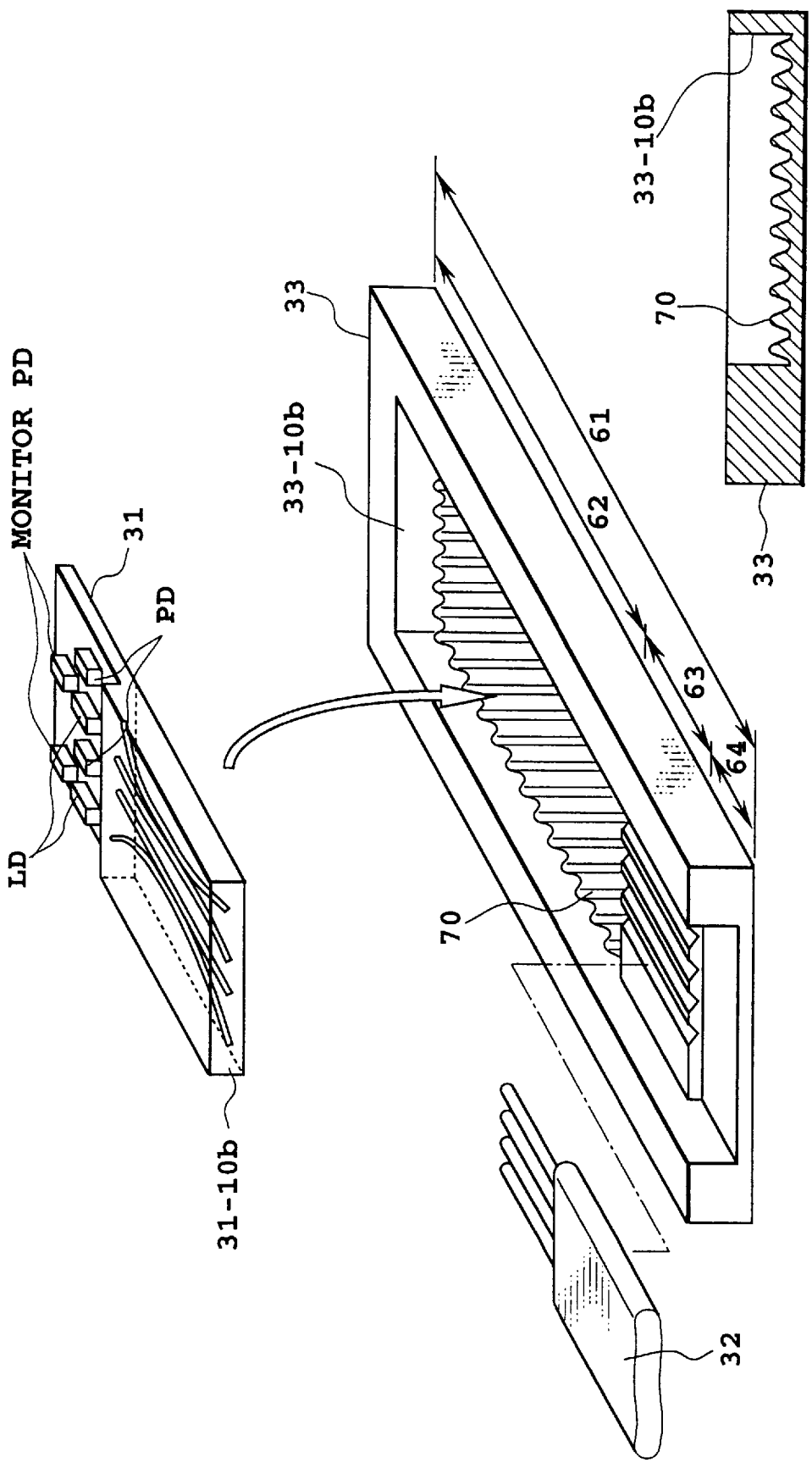

ded Feb. 9, 1998 in
PACKAGING PLATFORM, OPTICAL MODULE USING THE PLATFORM, AND METHODS FOR PRODUCING THE PLATFORM AND THE MODULE This application is based on patent application Ser. No. 58,876/1997 filed Mar. 13, 1997, Ser. No. 198,083/1997 filed Jul. 24, 1997 and No. 27,558/1998 filed Feb. 9, 1998 in Japan, the contents of which are incorporated herein by reference.

BACKGROUND OF THE INVENTION

1. Field of the Invention

The present invention relates to a packaging platform capable of accurately and easily connecting one or more optical fibers to one or more optical components having functions, such as optical detection, optical signal branching, optical multiplexing, optical switching and optical modulation; and an optical module comprising one or more optical components and such one or more packaging platforms.

2. Description of the Prior Art

In an optical component using a planar optical waveguide circuit, connection between an optical waveguide and an optical fiber requires alignment precision of the order of microns. Simplifying this connection is very important in reducing the manufacturing cost. An optical component which processes fast signals involves fine electrical wiring, and thus requires a fan-out structure for electrical connection. An optical device generally needs sealing to achieve reliability. In an optical module having structures for a fiber pigtail and electrical wiring, it is necessary to seal large capacity regions above these structures. This has caused problems relating to packaging capacity and sealing effect.

Some structures of conventional optical modules are described below.

CONVENTIONAL EXAMPLE 1

"Self-aligned flip-chip assembly of photonic devices with electrical and optical connections", M. J. Wale, et al., IEEE Trans. Comp., Hybrids, Manufac. Technol., Vol. 13, No. 4 (1990)

FIG. 1 is a conventional example of a packaging structure which provides an optical connection between an optical waveguide and an optical fiber. This example realizes a structure in which an optical fiber 2 is fixed onto a V-shaped groove of an Si substrate 3 and connected to an optical waveguide 1a of an optical component 1. The optical waveguide 1 and the V-grooved substrate 3 are automatically aligned by the surface tension of solder bonds 3–31. The optical fiber 2 can thus be accurately positioned by a V-groove 3a. Since the positions of the optical fiber 2 and the optical waveguide 1 need to be determined accurately, however, packaging becomes laborious. According to this example, automatic alignment by the solder 3–31 is employed. To make the effect of surface tension during soldering work, optimization of the reflow conditions is required.

CONVENTIONAL EXAMPLE 2

"High impedance, high frequency crosstalk characteristics of a photodiode array and subcarriers", Kondo et al., 1994 Spring Conference of the Institute of Electronics, Information and Communications Engineers of Japan, ref. C-297

FIG. 2 shows a conventional example of packaging an optical component having an electrode. An active optical component is frequently used in high speed optical transmission. Thus, electrical wirings, etc. should be integrated. To package such a component as a module, a lead for taking out the electrode for connection to the outside should be formed. According to this example, an arrayed 4-channel optical device (photodiode) 1–3 is mounted on an optical component 1. From there, electrodes 1–4 for bonding are extended, and then bonding wires 101, chip resistors 102, and the bonding wires 101 are further provided, followed by lead wires 3–30 of a package (packaging platform) 3. As noted from this, packaging of an optical component with integrated parts requires an electrode withdrawal structure and wire bonding.

CONVENTIONAL EXAMPLE 3

"A study of automatic assembly of a non-adjustment packaging module", Nakagawa G. et al., 1995 Electronics Society Conference lecture papers of the Institute of Electronics, Information and Communications Engineers of Japan, ref. C-187

FIG. 3 shows a conventional example of a hermetically sealed optical module. An optical device (laser diode) 1–3 forms an optical component 1 attached onto an Si substrate. On a package 3 as a packaging platform, there are mounted an electric cable 3–40 for electric signal transmission and an optical fiber 2. The optical fiber 2 is fixed onto the Si substrate by a cover 5. After these steps, a sealing cover 3–50 is hermetically applied such that the entire optical component 1 is sealed, thereby providing a structure for a completely hermetic state. Such hermetic sealing requires a special container, making the packaging volume large. In addition, the use of the electric cable for electric signal transmission tends to lengthen the transmission distance. The resulting structure makes it difficult to accommodate a high frequency signal because is of electric characteristics. As long as such a sealing form is employed, the more complicated the electrical wirings become, the larger the packaging volume and the worse the deterioration of signals will be.

As seen in the above conventional examples, packaging of an optical component required the optical axis alignment of the optical waveguide and the optical fiber, and the structure for taking out an electrode from a fine electrode. Moreover, strict sealing was required, thereby imposing a severe burden on packaging.

In an optical module using a planar optical waveguide circuit, as described above, connection between the optical waveguide and an optical fiber has so far required a high accuracy aligning apparatus or an advanced packaging technique for performing precision positioning, even when a fiber guide structure is used.

Another example is the production of an optical switch utilizing a thermooptic effect, or an optical module having an active portion on an optical waveguide circuit, such as a hybrid optical module having an optical semiconductor device packaged on an optical waveguide substrate. This production has posed the problem of electrical connection as well as the above-mentioned optical fiber connection. That is, wire bonding is needed to connect the electrical wiring portion of the optical waveguide circuit to another part such as a package. In handling a fast signal by use of the characteristics of an optical signal, in particular, a high density electrical wiring is required of the optical module. Needs also exist to eliminate the routing of the electrical wiring or provide a microstructure to an electrical pad or the like. The step of electrical connection, such as bonding the wiring onto a miniscule electrode pattern, is also complicated.

The above hybrid optical module has further required sealing of the surroundings of the optical semiconductor device, and needed for this purpose is the step of mounting a sealing cover. This method has caused problems such as an increased volume of the optical module, or an adverse influence on electrical signals due to an increased electrical wiring length associated with the increased volume.

The conventional way of packaging an optical waveguide circuit module, as described above, has required many steps such as an electrical connecting step and a sealing step as well as an optical fiber connecting step. Also, precise alignment has been required.

SUMMARY OF THE INVENTION

An object of the present invention is to provide a packaging platform which can simplify all packaging steps including electrical connection and sealing as well as optical connection in connecting one or more optical components to one or more optical fibers and can improve the dimensional accuracy of alignment, an optical module comprising the packaging platform, and methods for producing the packaging platform and the optical module.

In one aspect, the present invention is directed to a packaging platform for achieving optical coupling between one or more optical waveguides of an optical component having the optical waveguides and one or more optical fibers; the packaging platform including a reference structure portion for performing the horizontal and vertical positioning of the optical component, and a fiber positioning portion for inserting and holding the optical fiber and positioning the optical fiber at a position where the optical fiber is optically connected to the optical waveguide.

To perform an electrical connection to the optical component when the optical component has an electrode pattern, an electrical wiring pattern may be provided at a position opposed to an electrode pad of the electrode pattern of the optical component when the optical component is positioned relative to the optical fiber.

The optical component may have an optical device for optical connection to the optical waveguide of the optical component, and a depressed portion may be present at a position opposed to the optical device when the optical component is positioned relative to the optical fiber.

In the packaging platform, there may be a plurality of the optical components, and the packaging platform may have reference structure portions for performing the horizontal and vertical positioning of these optical components relative to one another.

In the packaging platform, the fiber positioning portion may be V-shaped or cylindrical in cross section.

In the fiber positioning portion, an insertion/removal structure for making the optical fiber insertible and removable may be formed.

In the packaging platform, the reference structure portion of the platform and a portion of the optical component may be provided with fitting shape portions which are fitted to each other to position the optical component relative to the platform. The fitting shape portion may have a stepped shape, and the fitting shape portion of the optical component may be in such a shape as to be fitted to the stepped shape.

In the packaging platform, at least one groove to permit escape of excess adhesive may be formed in a mounting portion of the platform which the optical component contacts.

The packaging platform may have a cover for holding the optical fiber in an arrayed state when fixed to the platform after the optical fiber is connected to the platform having the optical component mounted thereon.

In the packaging platform, a polymer optical waveguide circuit may be packaged on the platform.

The packaging platform may be composed of a synthetic resin composition. Desirably, this synthetic resin composition has a mold shrinkage coefficient of not more than 1%, and the shrinkage coefficient is isotropic, or the ratio of its maximum value to its minimum value is not more than 1.5. The synthetic resin composition may consist essentially of a thermosetting resin and may contain an inorganic filler. The thermosetting resin may be an epoxy resin. The inorganic filler may be a silica powder.

The synthetic resin composition may consist essentially of an amorphous polymer and may contain an inorganic filler. The inorganic filler may be an inorganic crystalline powder, or an inorganic glass powder, or a mixture of these. The amorphous polymer may be polyethersulfone, polysulfone, polyetherimide, or a mixture of these.

The packaging platform may be formed of a ceramic material.

The packaging platform may be produced using a mold, and molding with this mold may be injection molding or transfer molding.

Another packaging platform of the present invention may comprise a packaging platform for achieving optical coupling between one or more optical fibers and one or more optical waveguides of one or more optical components having the optical waveguide and/or an optical receiving device and/or an optical emitting device and an electrical circuit for controlling the optical device; the packaging platform including a reference structure portion for performing the horizontal and vertical positioning of the optical component, and a fiber positioning portion for inserting and holding the optical fiber and positioning the optical fiber at a position where the optical fiber is optically connected to the optical waveguide.

The optical module of the present invention may comprise an optical component and an optical fiber packaged on the packaging platform of the foregoing configuration. The optical fiber of the optical module may have an optical connector mounted thereon.

Another optical module of the present invention may comprise an optical component having an optical waveguide and an electrode pattern, and also having a height reference surface provided at a position apart by a predetermined height from a core portion on the surface of the optical waveguide, and a horizontal reference structure portion provided at a position apart by a predetermined distance from the core portion; and a packaging platform having a height reference surface for determining the altitudinal position of the optical component on the platform and a horizontal reference structure portion for determining the horizontal position of the optical component on the platform, and also having a fiber positioning portion for inserting and holding an optical fiber and positioning the optical fiber at a position where the optical fiber is optically connected to the optical waveguide of the optical component, and an electrical wiring pattern provided at a position opposed to one or more electrode pads of the electrode pattern on the optical component; in which the horizontal reference structure portions of the optical component and the packaging platform may be aligned with each other, and the height reference surfaces of the optical component and the packaging platform may be brought into contact with each other, whereby the alignment and electrical connection of the electrode pattern and the electrical wiring pattern may be achieved, and the optical fiber inserted into the fiber positioning portion and the optical waveguide may be aligned simultaneously.

In the optical module, the optical component may have an optical device to be optically connected to the optical waveguide of the optical component, and the packaging platform may be further provided with a depressed portion at a position opposed to the optical device when the optical component is positioned relative to the optical fiber.

In the optical module, there may be a plurality of the optical components, and the packaging platform may be further provided with a reference structure portion for performing the horizontal and vertical positioning of the optical components relative to one another. The horizontal reference structure portion may be a wall surface prepared by etching a cladding portion of the optical waveguide of the optical component, or may be a rib-shaped protrusion formed in the optical component. This rib-shaped protrusion may be the optical waveguide shaped like a rib of the optical component. The height reference surface of the optical component may be an exposed substrate surface formed when the cladding portion of the optical waveguide of the optical component has been removed to expose the substrate surface.

In the optical module, the horizontal reference structure portion of the optical component may be a pair of engagement surfaces formed obliquely in the cladding portion of the optical waveguide of the optical component in the longitudinal direction of the optical waveguide, while the horizontal reference structure portion of the packaging platform may be a pair of engagement surfaces to come into contact with the pair of engagement surfaces of the optical component. The pair of engagement surfaces of the optical component may be placed at linearly symmetric positions with respect to an axis parallel to the optical axis of exit light from the optical waveguide.

In the optical module, an insulating sealing resin may be filled into a gap between the optical component and the packaging platform. By adjusting the size of the gap between the optical component and the packaging platform, penetration of the resin into a specific portion may be inhibited.

In the optical module having the depressed portion, sealing of the optical device may be achieved by filling an insulating and transparent resin into the depressed portion.

In the optical module, the packaging substrate may be composed of a synthetic resin composition, the mold shrinkage coefficient of the synthetic resin composition may be not more than 1%, and the shrinkage coefficient may be isotropic or the ratio of its maximum value to its minimum value may be not more than 1.5. The synthetic resin composition may consist essentially of a thermosetting resin and may contain an inorganic filler. The thermosetting resin may be an epoxy resin. The inorganic filler may be a silica powder.

In the optical module, the synthetic resin composition may consist essentially of an amorphous polymer and may contain an inorganic filler. The inorganic filler may be an inorganic crystalline powder, or an inorganic glass powder, or a mixture of these. The amorphous polymer may be polyethersulfone, polysulfone, polyetherimide, or a mixture of these.

In the optical module, the packaging platform may be formed of a ceramic material.

In the optical module, the fiber positioning portion may be V-shaped or cylindrical in cross section.

In the optical module, an insertion/removal structure for making the optical fiber insertible and removable may be formed in the fiber positioning portion.

A method for production of an optical module of the above-described configuration comprises packaging the optical component on the platform, connecting the optical fiber to the optical component, and then sealing an upper part or the whole of the platform with a resin mold.

The above and other objects, effects, features and advantages of the present invention will become more apparent from the following description of embodiments thereof taken in conjunction with the accompanying drawings.

BRIEF DESCRIPTION OF THE DRAWINGS

FIG. 28A is a perspective view of a packaging platform as a thirteenth embodiment of the present invention;

FIG. 28B is a sectional view of the platform illustrated in FIG. 28A.

DETAILED DESCRIPTION OF THE PREFERRED EMBODIMENTS

Figure 1:
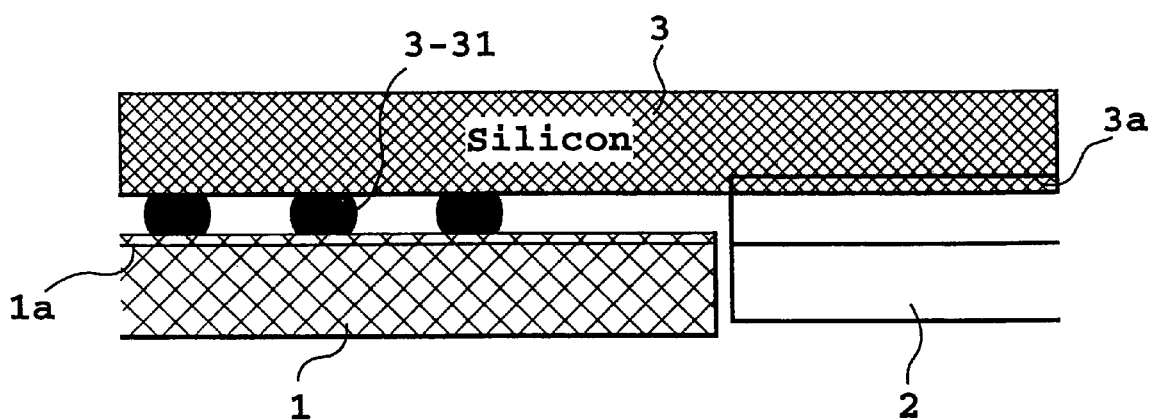
FIG. 1 is a side view showing a structure for alignments of an optical waveguide with an optical fiber according to an earlier technology.
Figure 2:
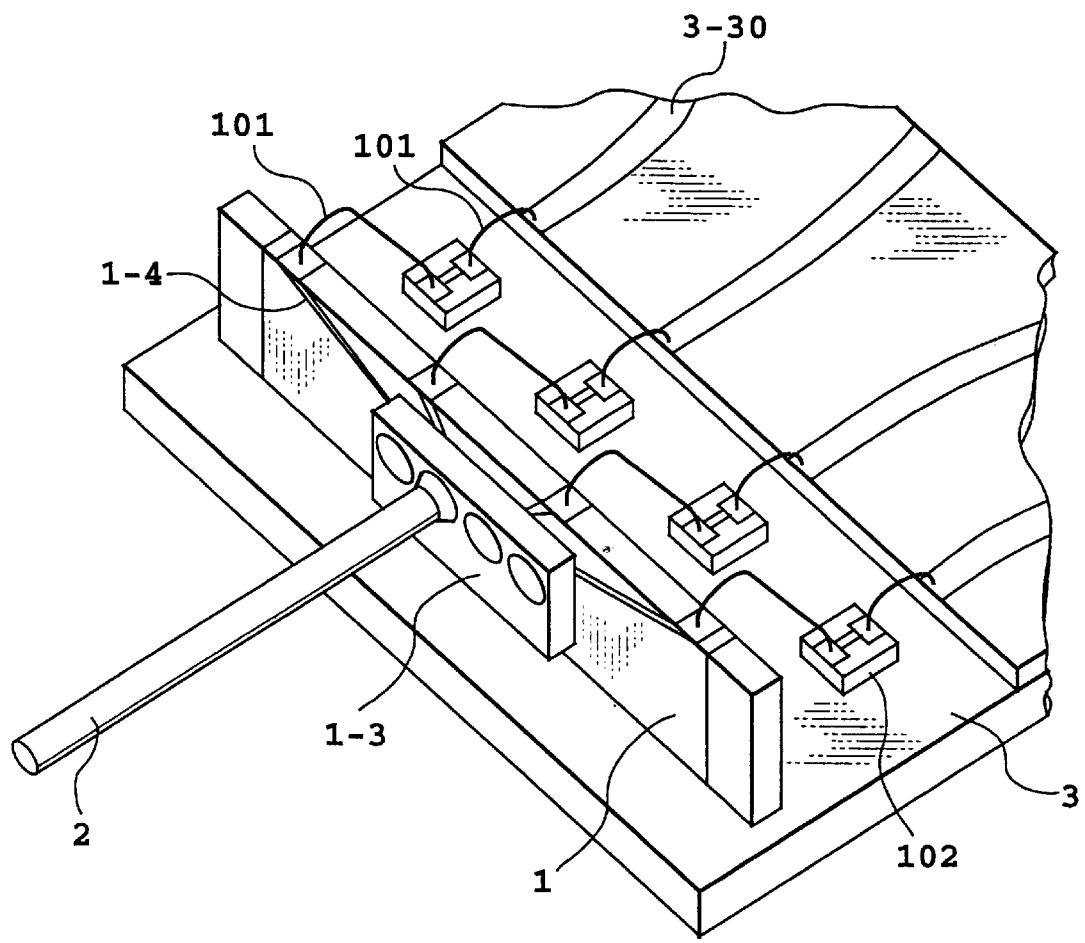
FIG. 2 is a perspective view showing a structure for withdrawal of an electrode in an optical component according to an earlier technology.
Figure 3:
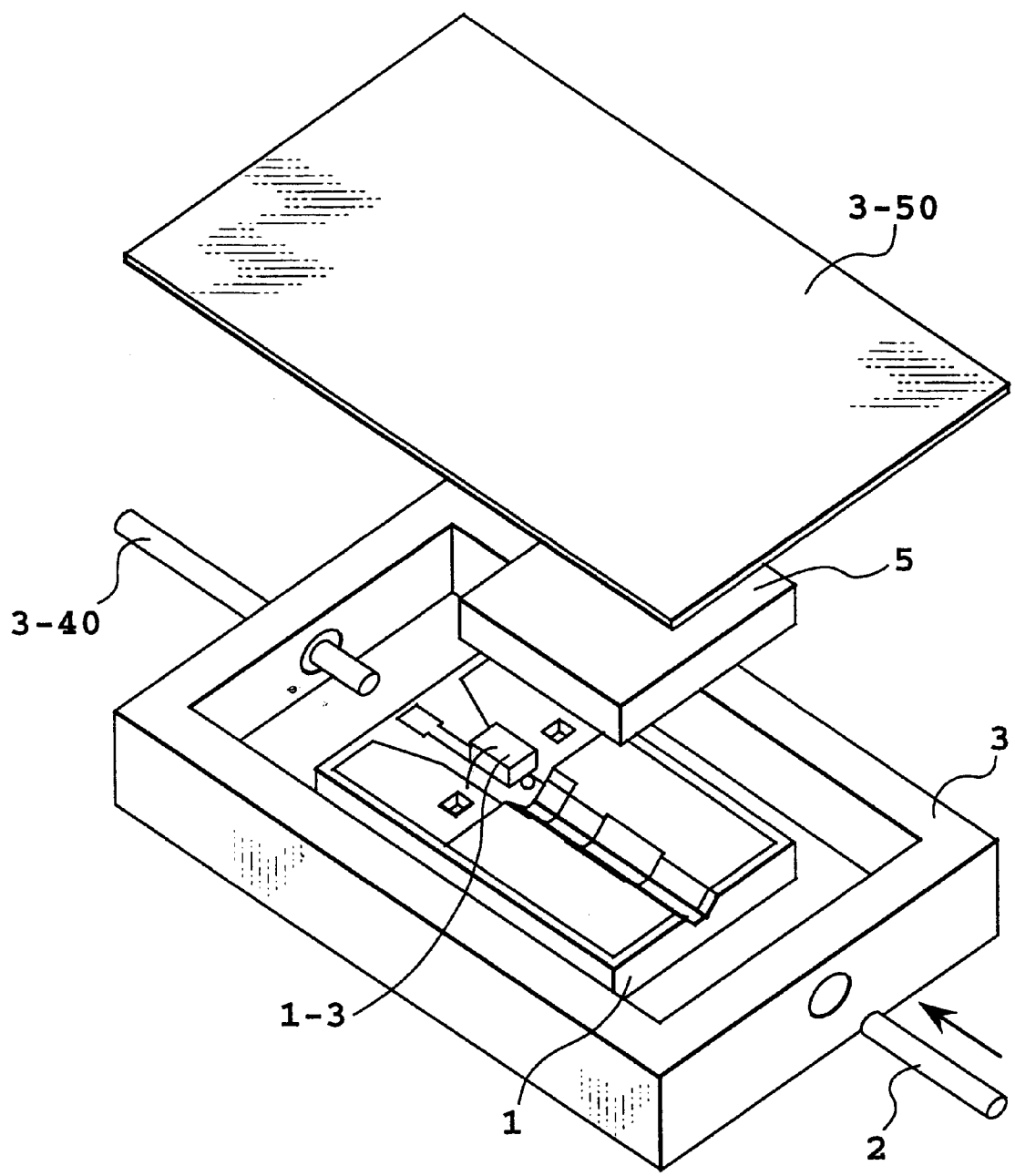
FIG. 3 is an exploded perspective view showing a hermetically sealed optical module according to an earlier technology.

As described earlier, the present invention has aimed at attaining the aforementioned object. For this purpose, the invention has completed high accuracy alignment concerned with fiber connection, electrical connection and a simplified sealing method, simply by installing optical components on a packaging platform having a guide structure for simplifying positioning.

As means for attainment, the invention comprises the structure of a packaging platform, and provides the constitution of an optical module using this packaging platform. The invention also provides methods for producing the packaging platform and the optical module.

According to the packaging platform of the invention, an optical fiber positioning groove and an electrical wiring pattern are provided at certain distances from a horizontal reference structure portion and a vertical reference structure portion on the platform. On an optical component, horizontal and vertical reference structure portions corresponding to the reference structure portions on the packaging platform are provided, and an optical waveguide and an electrode pattern are provided at predetermined distances from these reference structure portions. Thus, an optical functional device is placed so as to bring the reference structure portions of the packaging platform into agreement with the reference structure portions of the optical component. Simply by so doing, alignment with an optical fiber, and alignment between the electrode of the optical component and the electrical wiring on the packaging platform can be realized at the same time.

The reference structure portion may have a planar, linear or punctate structure. That is, a reference surface, a reference line or a reference point is used for positioning. The reference surface refers to a flat or curved surface. The reference line refers to a ridgeline portion of a protuberant structure. The reference point means an apical portion of a protuberant structure. In addition to them, the reference line and the reference point may be marks printed in a linear and a punctate form, respectively. The mark is suitable in performing positioning by optical reading. The punctate reference structure portion may be a perforation. The reference line also includes a case in which positioning is carried out by a virtual surface formed by a row of ridgelines of a V-shape or corrugated form. The reference point also includes a case in which positioning is carried out along a virtual surface formed by an arrangement of pyramidal or conical apices.

The horizontal reference structure portion of the optical component may be formed of a pair of engagement surfaces which are obliquely processed parts of the optical waveguide cladding portion. The horizontal reference structure portion of the packaging platform may be a pair of engagement surfaces corresponding to the engagement surfaces which make up the horizontal reference structure portion of the optical component. The two oblique engagement surfaces of the optical component may be disposed at linearly symmetrical positions with respect to an axis parallel to the optical axis of light leaving the optical waveguide.

Because of the foregoing constitution, a coaxial state between the optical axes of the optical waveguide and the optical fiber can be achieved accurately by contacting the horizontal reference structure portion (engagement surfaces) of the packaging platform and the horizontal reference structure portion (engagement surfaces) of the optical component with each other, even if the dimensions of both horizontal reference structure portions deviate slightly from the design values. The reason is explained in connection with FIGS. 4A, 4B and 4C.

Figure 4A:
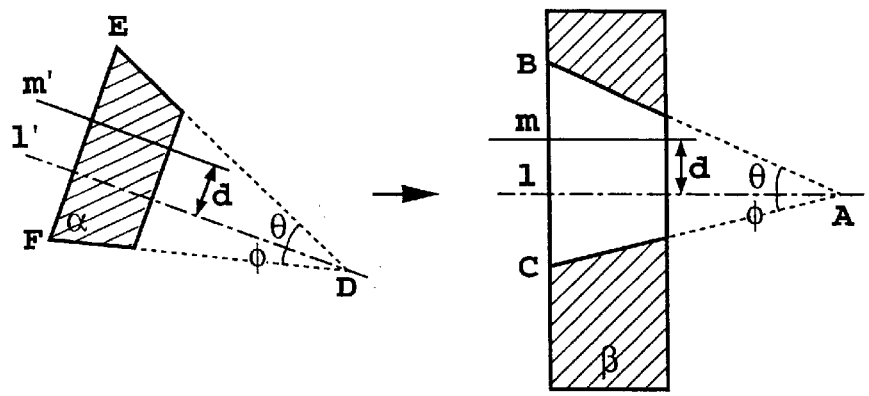
FIGS. 4A–4C are views for illustrating the reason why optical axis registration between an optical waveguide and an optical fiber can be achieved with high accuracy.
Figure 4B:
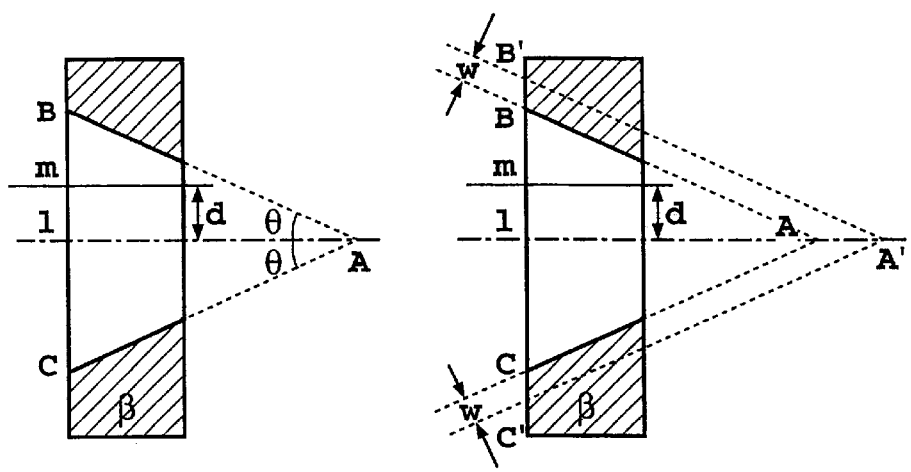
Figure 4C:
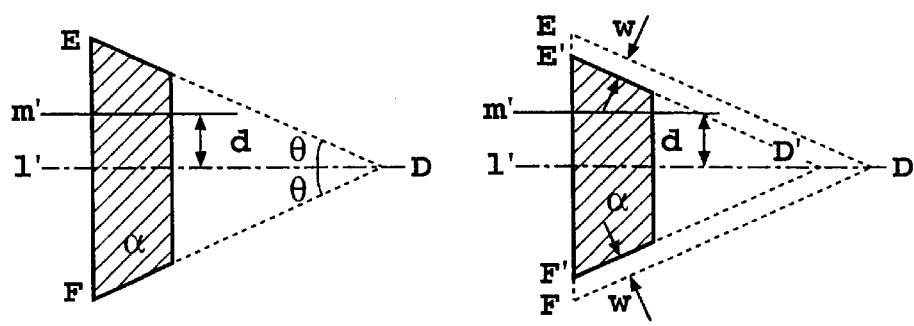

FIGS. 4A, 4B and 4C the shaded areas correspond to the reference structure portion of an optical component (or a packaging platform). First, consider a triangle DEF and a triangle ABC formed by extending the edges of an optical component α and a packaging platform β, respectively. At this time, the triangles DEF and ABC are designed as similar triangles by setting the angles θ and φ of both triangles to be the same. When the apex D is headed toward the apex A, the side AB agrees with the side DE, and the side CA agrees with the side FD, automatically. That is, the reference portions of α and β come into agreement. Since the triangles ABC and DEF are similar to each other, the straight lines 1 and 1' illustrated in the drawings also agree. Thus, one will see that if the optical waveguide on β is to be coupled to an optical fiber placed at a position apart from 1 by d, it suffices to place the optical waveguide on β at a site apart from 1' by d. Hence, even when there are a plurality of alignment sites, it is clear that mere alignment of distances relative to the reference line is enough.

Next, consider a case in which the reference of either the optical component α or the packaging platform β uniformly falls behind the design value for the convenience of the fabrication procedure. FIG. 4B shows the edges of the packaging platform β receding by the distance w. The triangle ABC corresponds to a new triangle A'B'C'. Since the changes in this case are uniform, however, the new triangle keeps the feature of being similar to the triangle DEF. Thus, if the angles θ and φ remain equal, the position of the reference line 1 is unchanged, and the optical fiber and the optical waveguide can be aligned as described above. As shown in FIG. 4C, the same is true when the edges of the optical component α recede.

The gap between the optical component and the packaging platform may be filled with an insulating and transparent or opaque sealing resin. By so doing, sealing of the optical component that should be sealed can be easily achieved.

The electrical wiring pattern provided on the packaging platform of the present invention is usually used to transmit signals to the electrical circuit piece parts mounted on the optical component, or drive or modulate the light detecting and emitting devices. The electrical wiring can be formed by various methods such as a molding method including a lead frame structure, or a method of circuit formation by MID when using injection molding.

The fiber positioning portion on the packaging platform of the invention may be cylindrical in shape. This cylindrical structure allows alignment while inserting an optical fiber, and desirably has a cylinder with a slightly larger diameter than the fiber diameter. To insert the fiber smoothly, the input of the cylindrical structure through which the fiber is inserted should desirably constitute a tapered guide having a considerably larger diameter than the fiber diameter.

The packaging platform of the invention brings more advantages when composed of a synthetic resin composition. The synthetic resin composition referred to here may be a thermoplastic resin or thermosetting resin alone or in combination with a filler. Alternatively, it may be a laminate of a synthetic resin and other material. Anyway, the composition may be selected in the light of the environment in which the packaging platform is actually used. Generally, the packaging platform is required to have high dimensional accuracy, environment resistance (resistance to temperature, humidity or the like), and certain mechanical strength. Thus, the packaging platform is required to be minimal in size changing during processing, high in heat resistance and humidity resistance, and high in strength and modulus of elasticity. More concretely, it is important to select a material with reduced deformation due to mold shrinkage during processing, and having a high heat distortion temperature, a low thermal expansion coefficient, high strength and high modulus of elasticity. For this purpose, it is desirable to use various reinforced plastics and heat resistant engineering plastics in a suitable combination. The platform is fabricated, most commonly, by the use of a precision processed mold, but can be prepared by precisely machining a plate material.

The mold shrinkage coefficient of the synthetic resin composition is not more than 1%, and is isotropic or the ratio of its maximum value to its minimum value is not more than 1.5. A more concrete embodiment of the synthetic resin composition that realizes the dimensional accuracy required for the packaging platform of the invention is such that mold shrinkage during the molding of the synthetic resin composition is as low as possible and its anisotropy is reduced. Generally, when a thermosetting resin is used, the values of physical properties related to molding can be made isotropic. When a thermoplastic resin is used, on the other hand, it is difficult to make the values of physical properties related to molding isotropic. However, the use of a resin composition having an anisotropy ratio of the shrinkage coefficient of not more than 1.5 gives a packaging platform with excellent characteristics. This has been clarified by the present invention. It has also been made clear that a mold shrinkage coefficient of not more than 1% can provide a product with little variation in dimensional values.

A further concrete constitution of the synthetic resin composition may be restricted to that composition consisting essentially of a thermosetting resin and containing an inorganic filler. Examples of the thermosetting resin in this constitution are phenolic resin, unsaturated polyester resin, epoxy resin, diallyl phthalate resin, silicone resin, and melamine resin. Examples of the inorganic filler are talc, mica, calcium carbonate, clay, alumina, alumina silica, silica, zinc oxide, carbon, aluminum hydroxide, asbestos fiber, glass fiber, and carbon fiber.

More concretely, epoxy resin may be used as the thermosetting resin. The epoxy resin referred to here is one which undergoes minimal size changing during processing, has high thermal resistance, and is high in strength and modulus of elasticity. Preferred examples of the epoxy resin are epoxy resins comprising epoxy resin precursors of the chemical formulae 1-1 to 1-29 and curing agents of the chemical formulae 2-1 to 2-6 as shown below. The ratio of the epoxy resin to the curing agent is preferably such that the ratio of the glycidyl groups in the epoxy resin to the hydroxyl groups in the curing agent is 1:1. A publicly known material such as an imidazole, an organophosphine compound, a urea derivative, or a phenolic novolak salt may be used as the curing promotor. Desirably, it is a material capable of improving stability at a temperature of about 100° C. at which injection molding becomes possible.

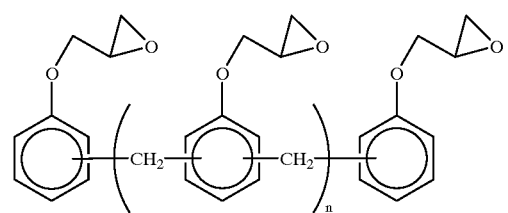
(1-1)
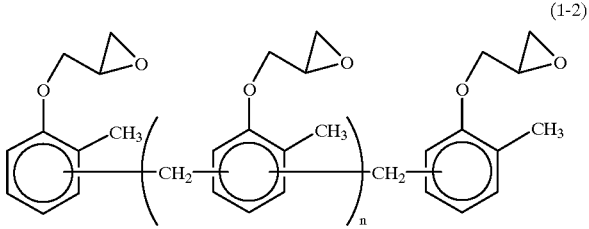
(1-2)
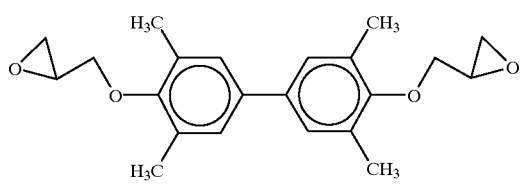
(1-3)
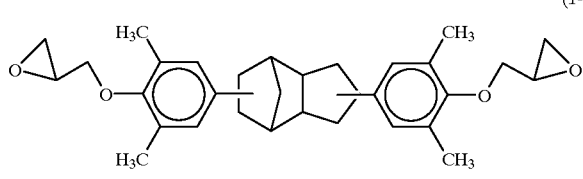
(1-4)
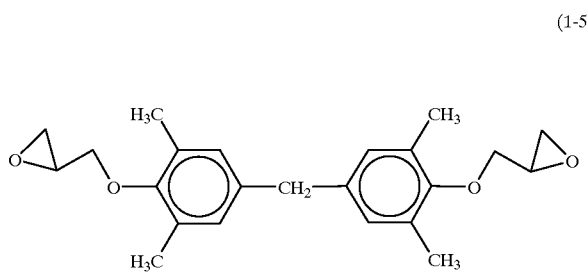
(1-5)
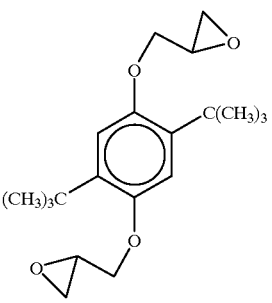
(1-6)
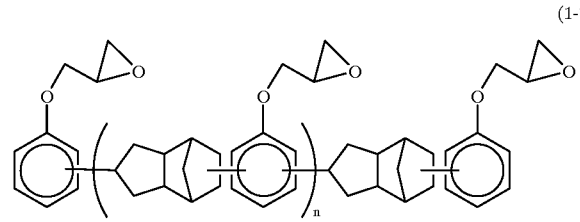
(1-7)
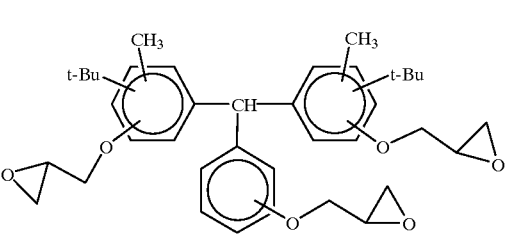
(1-8)
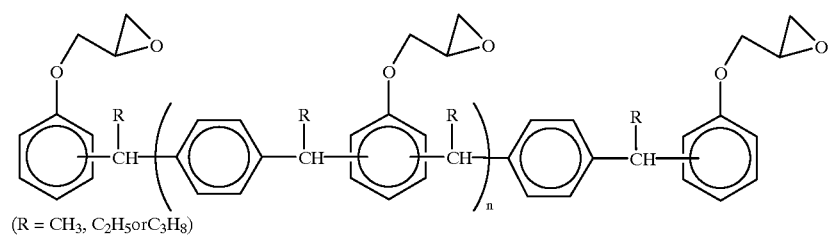
(1-9)
(R = $CH_3$, $C_2H_5$ or $C_3H_8$)
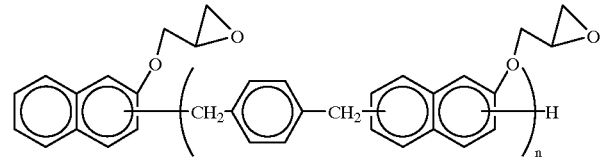
(1-10)
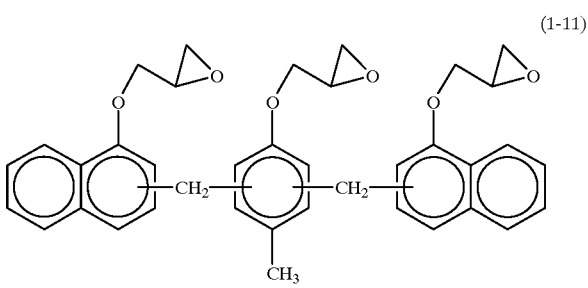
(1-11)

-continued
(1-12)
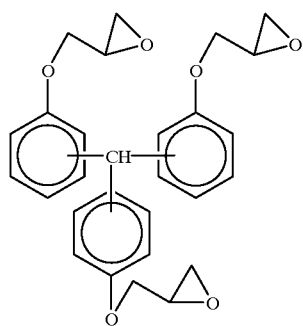
(1-13)
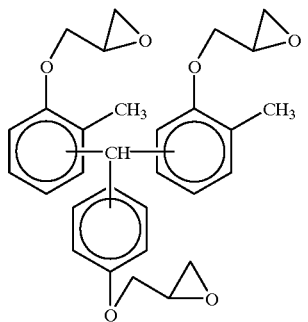
(1-14)
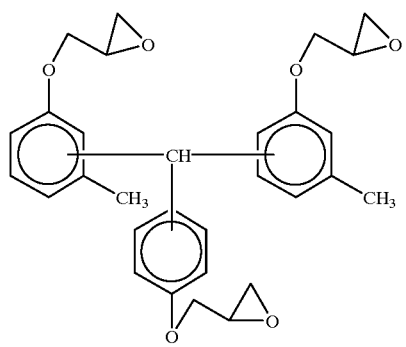
(1-15)
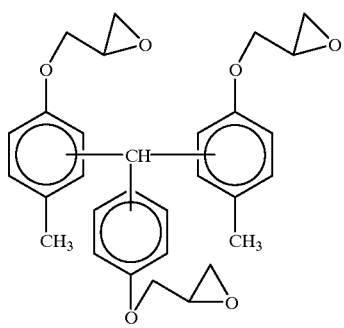
(1-16)
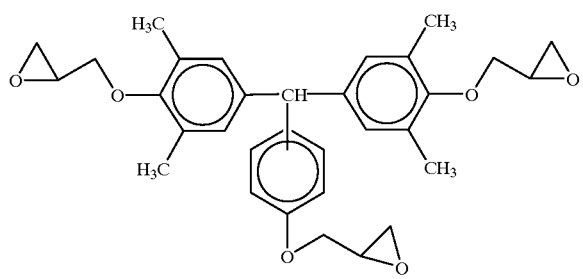
(1-17)
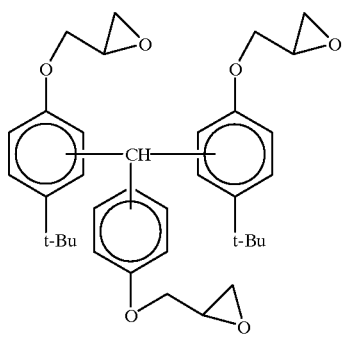
(1-18)
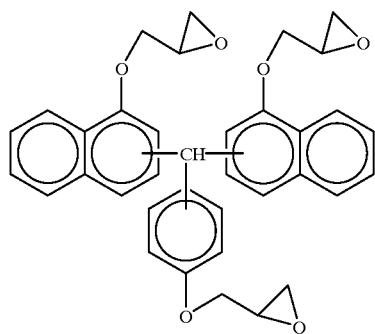
(1-19)
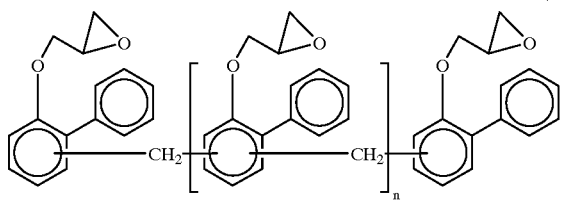

-continued
(1-20)
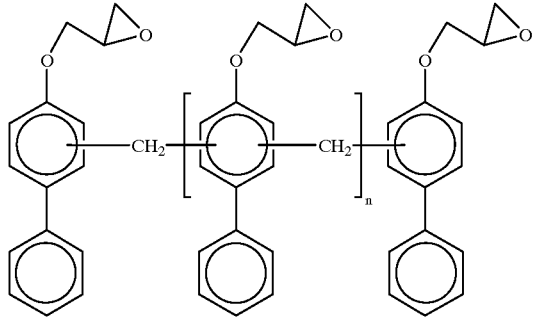
(1-21)
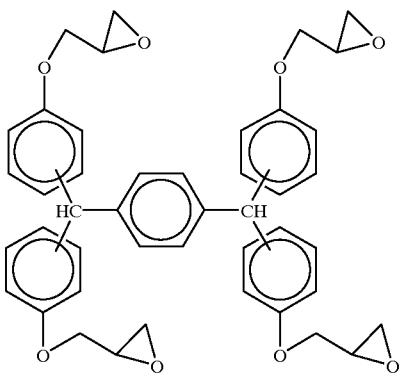
(1-22)
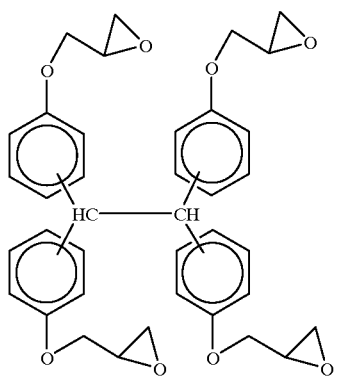
(1-23)
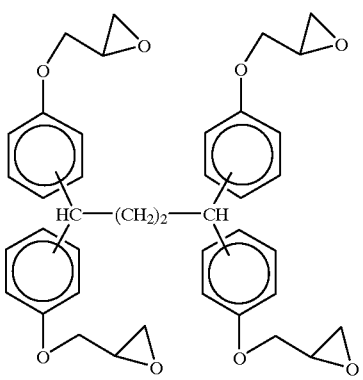
(1-24)
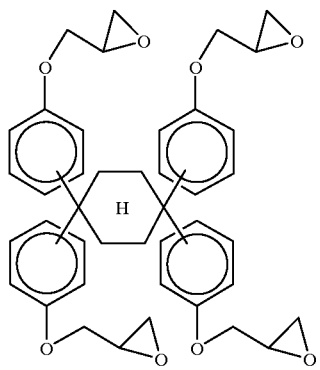
(1-25)
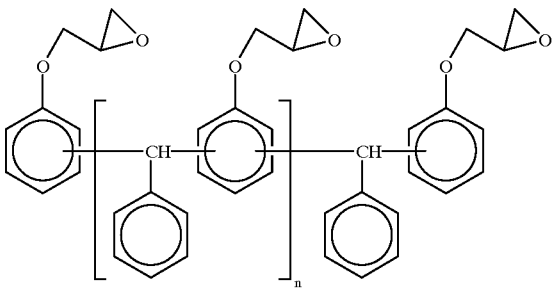
(1-26)
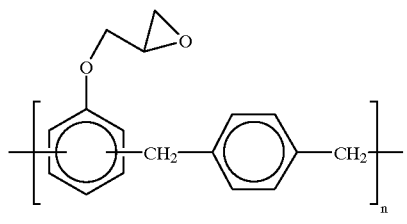
(1-27)
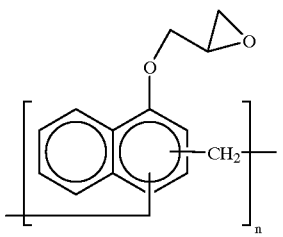

-continued (1-28)
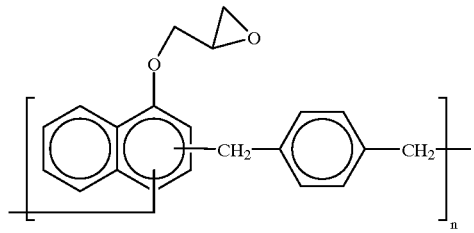

(1-29)
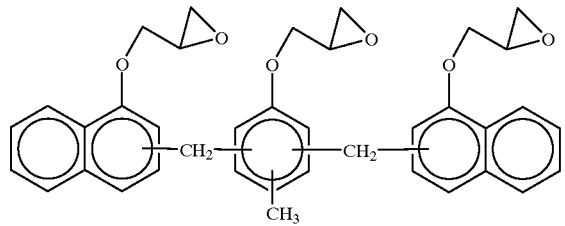

(2-1)
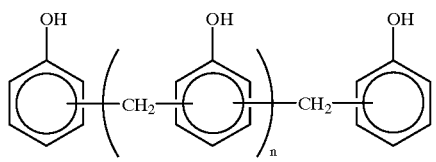

(2-2)
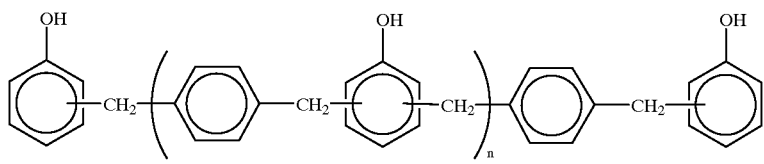

(2-3)
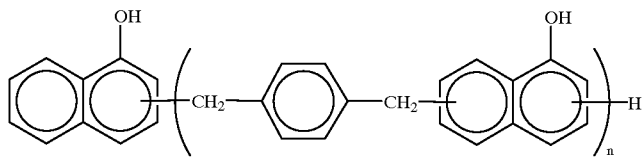

(2-4)                               (2-5)
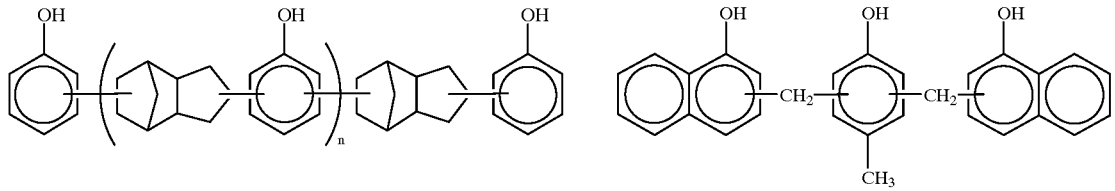

(2-6)
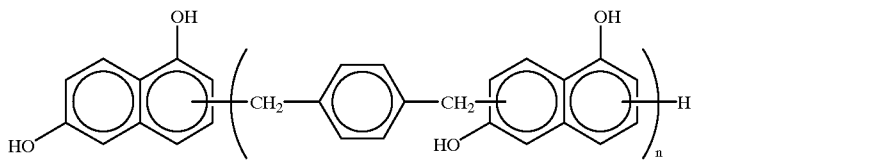

The amount of silica powder added as the inorganic filler should desirably be not less than 30% by weight.

Amorphous polymers are also preferred as the synthetic resin composition. Desirable examples of such polymers are polyethersulfone, polysulfone, polyetherimide, and mixtures of these. As the polyetherimide, polyetherimides of the structures indicated in chemical formulae 3-1 to 3-4 shown below can be used. As the polyethersulfone, polyethersulfones of the structures indicated in chemical formulae 4-1 to 4-5 shown below can be used.

(3-1)
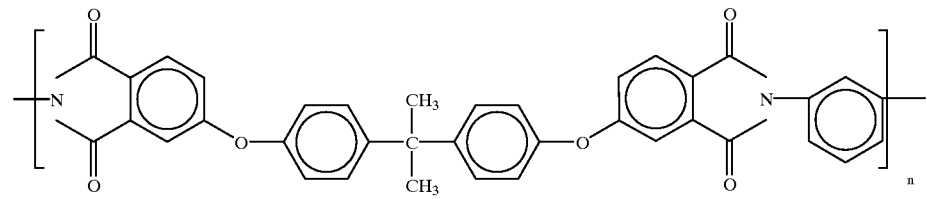

-continued

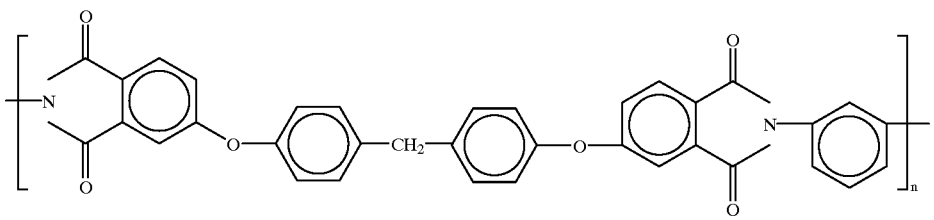

(3-2)

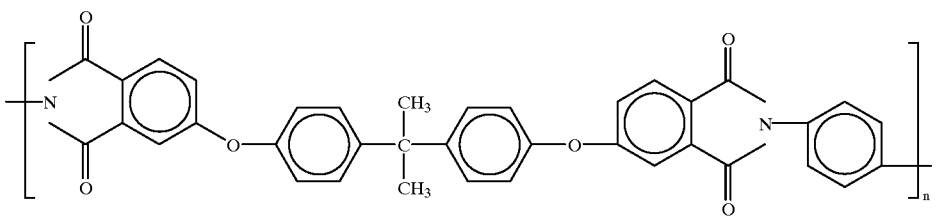

(3-3)

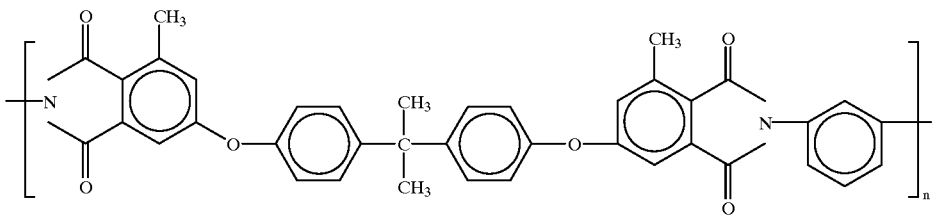

(3-4)

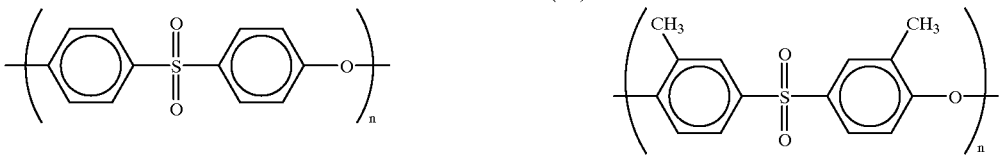

(4-1) (4-2)

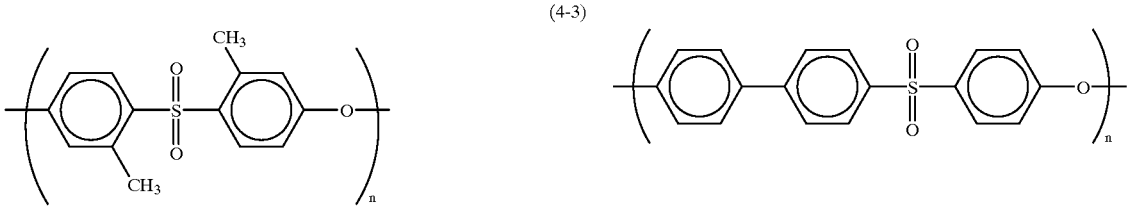

(4-3) (4-4)

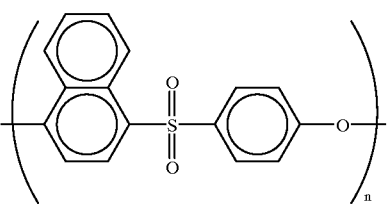

(4-5)

The optical connector mounted on the optical fiber constituting the optical module is an optical fiber-packaged device, such as MT, MU, MPO or SC, which has at the terminal portion of the optical fiber a structure capable of optical coupling to a packaging platform.

According to the optical module having the depressed portion, the optical device placed on the optical component is disposed in the depressed portion provided in the packaging platform, simply by putting together the reference structure portion of the packaging platform and the reference structure portion of the optical component. Thus, the state of a sealing cover being capped on the optical device can be realized substantially. That is, a single simple step can achieve all of the fiber connections, electrical connections, and sealing.

The horizontal reference structure portion of the optical component may be formed of two oblique engagement surfaces which are obliquely processed parts of the optical waveguide cladding portion. The horizontal reference structure portion of the packaging platform may be oblique engagement surfaces corresponding to the engagement surfaces of the optical component. The two oblique engagement surfaces of the optical component may be disposed at linearly symmetrical positions with respect to an axis parallel to the optical axis of light leaving the optical waveguide.

The gap between the optical component and the packaging platform excluding the depressed portion may be filled with an insulating sealing resin. By so doing, the depressed portion can show the function of hermetically sealing the optical device. Sealing of the optical device may be achieved by filling an insulating and transparent or opaque resin into the depressed portion. This measure enhances the sealing effect.

According to the optical module corresponding to a plurality of optical components, optical connection between the optical waveguides present in the plurality of optical components can be achieved simply.

In the optical module of this structure as well, the horizontal reference structure portion of the optical component may be formed of two oblique engagement surfaces which are obliquely processed parts of the optical waveguide cladding portion. The horizontal reference structure portion of the packaging platform may be oblique engagement surfaces corresponding to the engagement surfaces of the optical component. The two oblique engagement surfaces of the optical component may be disposed at linearly symmetrical positions with respect to an axis parallel to the optical axis of light leaving the optical waveguide.

If sealing is necessary, the gap between the optical component and the packaging platform may be filled with an insulating sealing resin.

The resin for used in the resin mold used in the method of producing the optical module of the invention is not restricted. For instance, a publicly known sealing material for various electronic circuits may be used.

The optical connector mounted on the optical fiber constituting an optical module of the invention is an optical fiber-packaged device, such as MT, MU, MPO or SC, which has at the terminal portion of the optical fiber a structure capable of optical coupling to a packaging platform.

According to an optical module of the invention having the depressed portion, the optical device placed on the optical component is disposed in the depressed portion provided in the packaging platform, simply by putting together the reference structure portion of the packaging platform and the reference structure portion of the optical component. Thus, the state of a sealing cover being capped on the optical device can be realized substantially. That is, a single simple step can achieve all of the fiber connections, electrical connections, and sealing.

The horizontal reference structure portion of the optical component may be formed of two oblique engagement surfaces which are obliquely processed parts of the optical waveguide cladding portion. The horizontal reference structure portion of the packaging platform may be oblique engagement surfaces corresponding to the engagement surfaces of the optical component. The two oblique engagement surfaces of the optical component may be disposed at linearly symmetrical positions with respect to an axis parallel to the optical axis of light leaving the optical waveguide.

The gap between the optical component and the packaging platform excluding the depressed portion may be filled with an insulating sealing resin. By so doing, the depressed portion can show the function of hermetically sealing the optical device. Sealing of the optical device may be achieved by filling an insulating and transparent or opaque resin into the depressed portion. This measure enhances the sealing effect.

According to an optical module of the invention, an optical connection between the optical waveguides present in the plurality of optical components can be achieved simply.

In the optical module of this structure as well, the horizontal reference structure portion of the optical component may be formed of two oblique engagement surfaces which are obliquely processed parts of the optical waveguide cladding portion. The horizontal reference structure portion of the packaging platform may be oblique engagement surfaces corresponding to the engagement surfaces of the optical component. The two oblique engagement surfaces of the optical component may be disposed at linearly symmetrical positions with respect to an axis parallel to the optical axis of light leaving the optical waveguide.

If sealing is necessary, the gap between the optical component and the packaging platform may be filled with an insulating sealing resin.

The resin for used in the resin mold used in the method of producing the optical module of the invention is not restricted. For instance, a publicly known sealing material or resin for mold packaging for various electronic circuits may be used.

The present invention will be described with reference to Embodiments. However, they are nothing but preferred embodiments for illustrating the invention, and do not restrict the invention.

Embodiment 1

Figure 5:
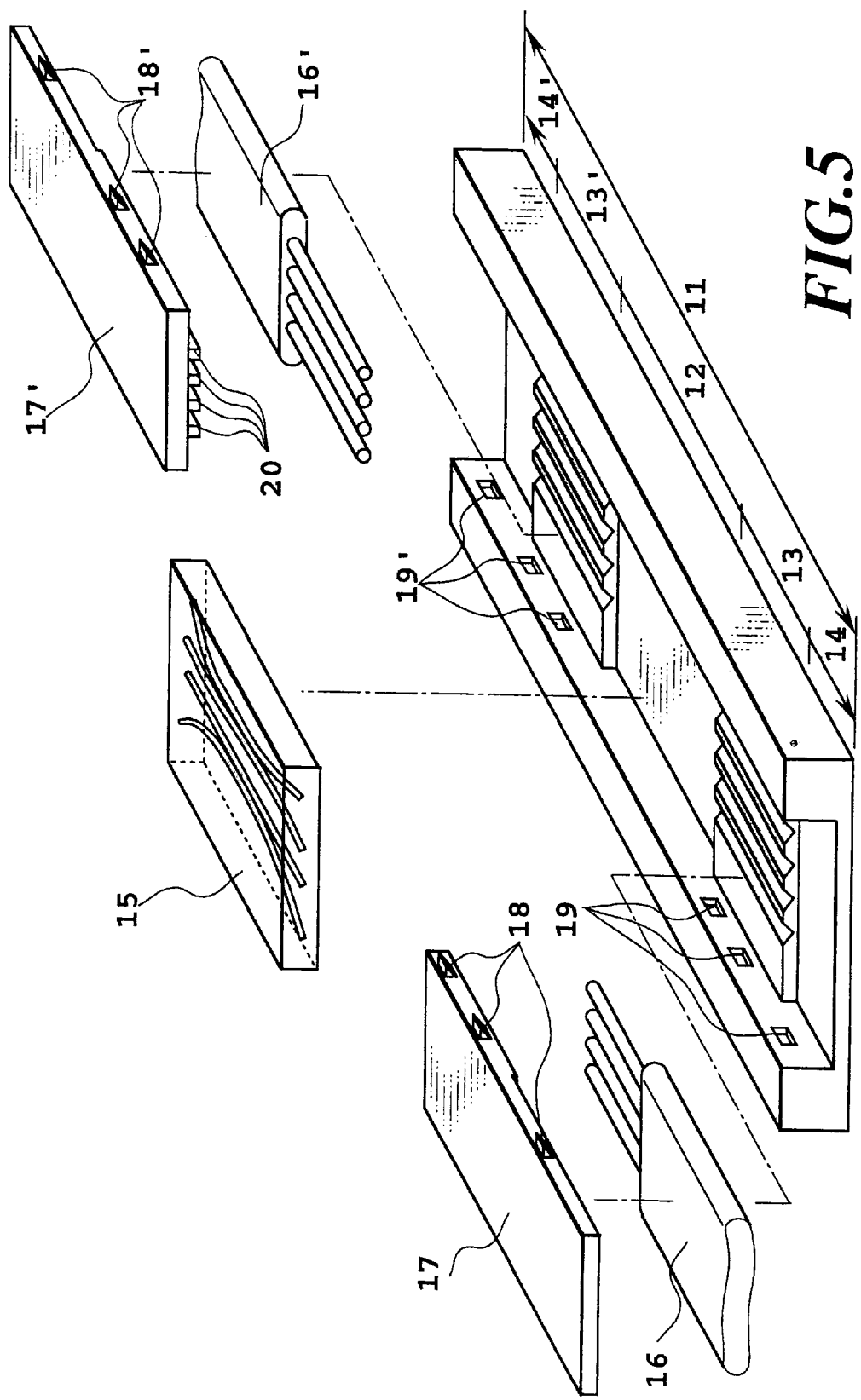
FIG. 5 is a perspective view showing first and third embodiments of the present invention.

The first embodiment of the invention is shown in FIG. 5. In FIG. 5, a packaging platform 11 was an injection molded article, composed of a concave structure (reference structure portion) 12 for inserting, positioning and fixing an optical component, V-groove portions 13, 13' (fiber positioning portions) capable of holding an array of optical fibers for input and output of light into and from the optical component and connecting the optical fibers to the optical component, and concave portions 14, 14' for accommodating and fixing the coating of the optical fiber ribbon enclosing a multiplicity of optical fibers.

Tables 1 and 2 show the specifications for the mold and the injection molding conditions. The resin used in molding was silica-containing epoxy resin. This epoxy resin was composed of 100 parts by weight of phenolic novolak type epoxy resin, 45 parts by weight of phenolic novolak resin, 15 parts by weight of a curing promotor, and 700 parts by weight of silica powder. The V-groove portions 13, 13' had a width of 140.3 $\mu$m, a groove depth of 121.5 $\mu$m, a groove angle of 60 degrees, and a groove interval of 250 $\mu$m. The dimensional accuracy of the mold was ±0.1 $\mu$m. Optical and mechanical measurements showed that the desired shape could be made with an accuracy of ±1 $\mu$m. The mold shrinkage was within 0.1%. A publicly known material such as an imidazole, an organophosphine compound, a urea derivative, or a phenolic novolak salt may be used as the curing promotor. Desirably, it is a material capable of improving stability at a temperature of about 100° C. at which injection molding becomes possible.

TABLE 1

| Mold specifications | |
| --- | --- |
| Item | Specification |
| Number of moldings | One |
| Method of temperature control | Heating with heater |
| Type of gate | Side gate |
| Runner | Cold runner |
| Number of plates | Two |

TABLE 2

Injection molding conditions

| Item | Conditions |
| --- | --- |
| Molding material | Thermosetting epoxy resin |
| Resin drying | 30° C., 2 days |
| Molding machine | Thermosetting injection molding machine |
| | Clamping force: 35 tons |
| | Screw diameter: 25 mm |
| Cylinder temp. | Nozzle portion: 40° C. |
| | Intermediate portion: 50° C. |
| | Rear portion: 90° C. |
| Mold temp. | 170° C. |
| Injection time | 20 sec |
| Curing time | 20 sec |
| Screw speed | 80 rpm |
| Screw back pressure | 7 kg/cm$^2$ |
| Injection pressure | 250 kg/cm$^2$ |

The flat portion and the flat portion in the guide groove could be brought into agreement in terms of height with an accuracy within 0.5 μm. That is, he concave structure 12 was produced with a dimensional accuracy of ±1 μm together with the V-groove portions 13, 13'. The size of the mold was designed in complete agreement with the dimensions of the light input and output portions of an optical component to be inserted into the concave reference structure 12.

This packaging platform could be produced with the same accuracy by transfer molding, and no difference in function was observed in the resulting two package platforms.

A packaging procedure using the packaging platform 11 will be described concretely herein. Four-fiber optical fiber ribbons 16, 16' were connected to both ends of an optical waveguide circuit 15 prepared from a polymeric resin material in this Embodiment, whereby an optical module could be easily produced.

First, the optical waveguide circuit 15 was inserted into the concave structure 12 of the packaging platform 11 and bonded with adhesive.

Then, the pair of optical fiber ribbons 16, 16' were deprived of the coating at the end, arranged and held in the V-groove portions 13, 13' for optical fibers.

Then, the pair of optical fiber ribbons 16, 16' were pressed against the V-groove portions 13, 13' by covers 17, 17' from above, and fixed there.

The material for the covers 17, 17' may be glass, quartz or metal, but covers molded from resin were used in this embodiment. The covers 17, 17' had tiny protrusions 18, 18' on both side walls thereof, which were to be fitted into tiny recesses 19, 19' formed in both inner side walls of the packaging platform 11. Thus, the optical fiber ribbons 16, 16' could be positioned easily.

The covers 17, 17' also had four tiny protuberances 20 in a direction along that of the optical fibers in order to ensure the positioning of the optical fibers. Thus, the optical fibers could be fixed easily.

Without such tiny protuberances 20, fundamental performance would not be impaired, because the V-groove portions 13, 13' were prepared accurately.

The optical fiber ribbons 16, 16' can be fixed only by the fitting of the covers 17, 17'. To ensure reliability, however, a thermosetting adhesive was used in this embodiment for reliable fixation.

The heat curing conditions were 90° C. for 2 hours (primary curing) and 140° C. for 3 hours (secondary curing).

The fixation of the optical fiber ribbons 16, 16' can be performed using ultraviolet curing resin by preparing the covers 17, 17' made from transparent resin.

This use of the packaging platform 11 enabled optical fiber ribbons to be connected together rapidly, correctly and reliably.

The so produced optical module had a connection loss of 5.1 dB on the average, and involved no alignment procedure. Thus, a marked decrease in the operating time was possible.

After fixing of the optical fibers, the entire packaging platform was sealed with resin, and the sealed product was examined for connection reliability by high temperature high humidity test (70° C., 90%). Even after passage of 2,000 hours, changes in connection characteristics were within 10%, confirming full reliability. Packaging of the entire packaging platform with a resin mold instead of a resin seal also demonstrated the same reliability.

Embodiment 2

Figure 6:
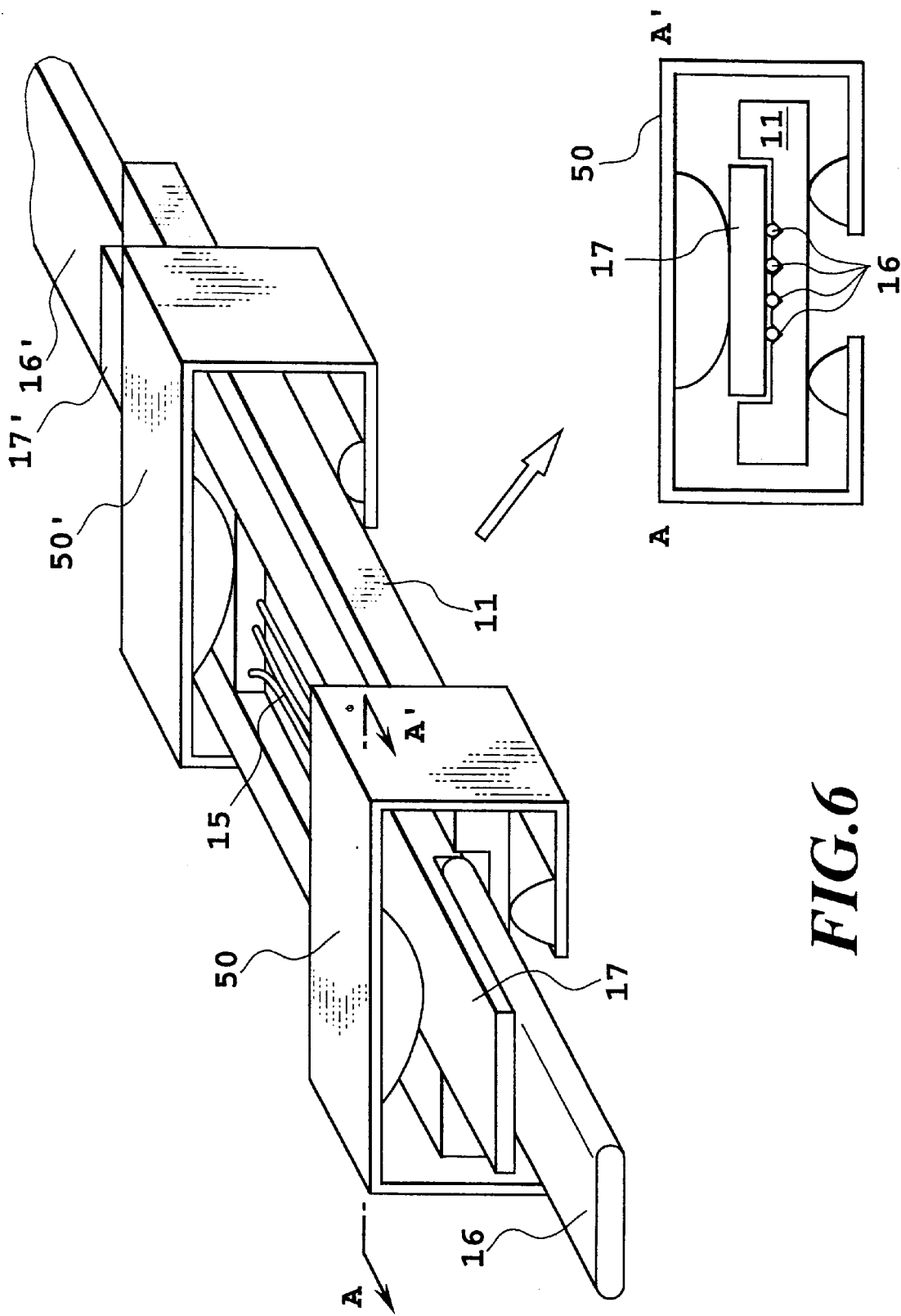
FIG. 6 is a perspective view showing a second embodiment of the present invention.

The second embodiment of the invention is shown in FIG. 6. In this embodiment, the tiny protrusions 18, 18' were omitted in the covers 17, 17' of Embodiment 1, and optical fiber ribbons 16, 16' were pressed with metallic spring piece parts 50, 50'. In this embodiment, exactly the same results as in Embodiment 1 were obtained for connection loss characteristics and reliability.

That is, no tiny protrusions were provided on both side walls of the covers 17, 17', and the metallic spring piece parts 50, 50' were provided for interposing the optical fiber ribbons 16, 16' between the packaging platform 11 and the covers 17, 17'. On the inner surface of each of the metallic spring piece parts 50, 50', a spring mechanism was provided to fix the optical fiber ribbons 16, 16' between the packaging platform 11 and the covers 17, 17' by its elastic spring force.

Another structure, which was the same as in the aforementioned Embodiment 1, was provided. When o-cresol novolak resin was used instead of phenolic novolak resin as the starting material, the same results were obtained.

Embodiment 3

This embodiment corresponded to Embodiment 1 in which a silica optical waveguide circuit was used as the optical component. The same connection loss characteristics and reliability of the packaging platform as in Embodiments 1 and 2 were confirmed. When o-cresol novolak resin was used instead of phenolic novolak resin as the starting material, the same results were also obtained.

Embodiment 4

Figure 7:
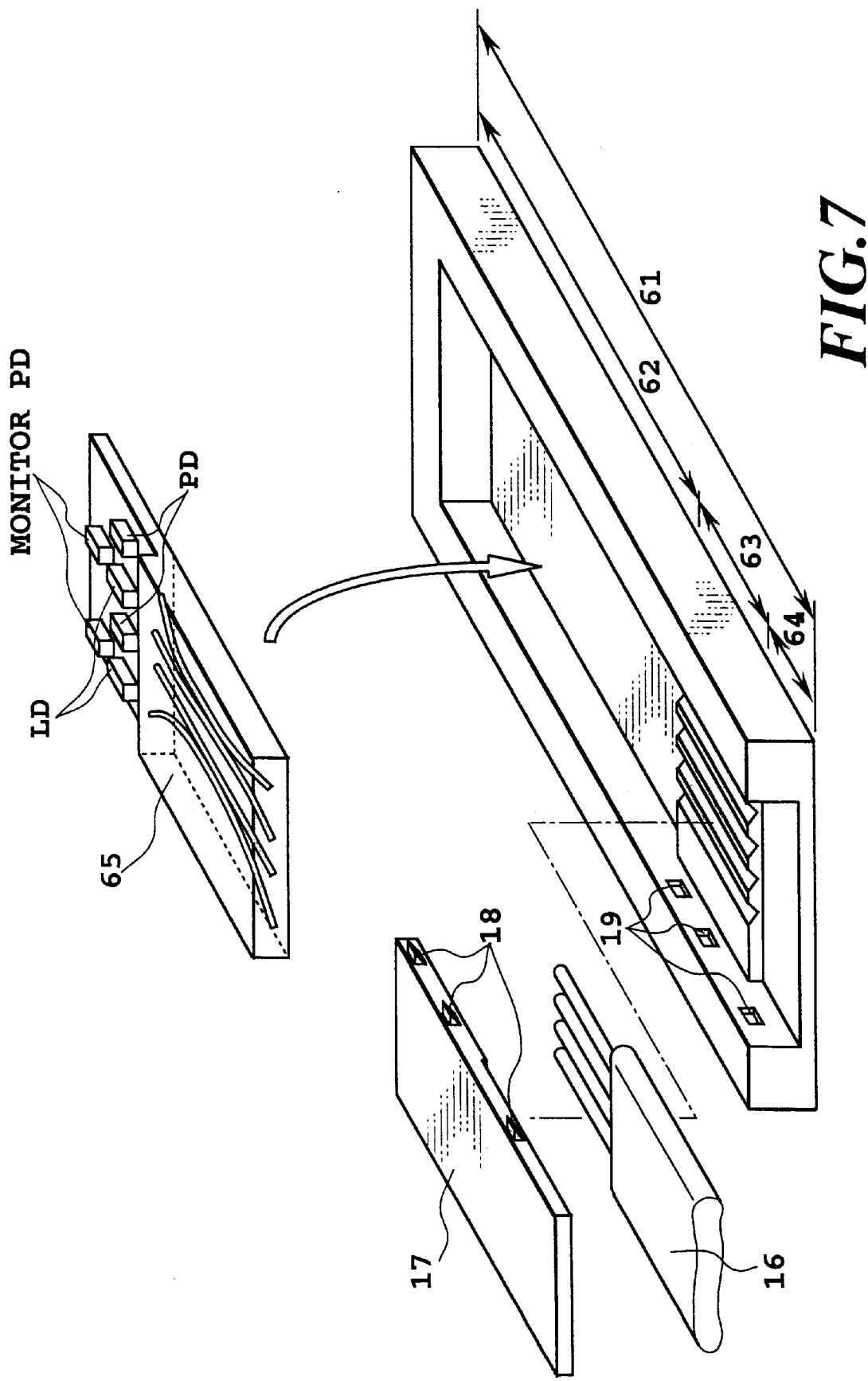
FIG. 7 is a perspective view showing a fourth embodiment of the present invention.

FIG. 7 shows the fourth embodiment of the invention. This embodiment involved only one input/output end of an optical component.

In FIG. 7, a packaging platform 61, as in Embodiment 1, was composed of a concave structure 62 for inserting, positioning and fixing an optical component, a V-groove portion 63 capable of holding and connecting optical fibers in an array, and a concave portion 64 for accommodating and fixing the coating of an optical fiber ribbon 16 enclosing a multiplicity of optical fibers. However, the V-groove portion 63 and the concave portion 64 for fixing the optical fibers are formed only at one end. The materials used were the same as in Embodiments 1, 2 and 3.

The method of fabricating the packaging platform and its dimensional accuracy were exactly the same as in Embodiment 1. An optical component 65 was a hybrid optical component comprising semiconductor lasers (LD's), semiconductor laser output monitoring photodiodes (PD's), and signal detecting photodiodes placed in combination on a silica optical waveguide circuit. The optical input/output end of this product was only one.

The packaging procedure was the same as in Embodiment 1, and the same connection loss characteristics and reliability of the packaging platform were confirmed.

According to the packaging platform, it was confirmed that even a simple combination of a semiconductor laser and a photodiode without the optical waveguide circuit used in this embodiment, namely, a transceiver or an individual optical component module, could be converted into a module, easily and in a short time, when connected to optical fibers and sealed.

Embodiment 5

Figure 8:
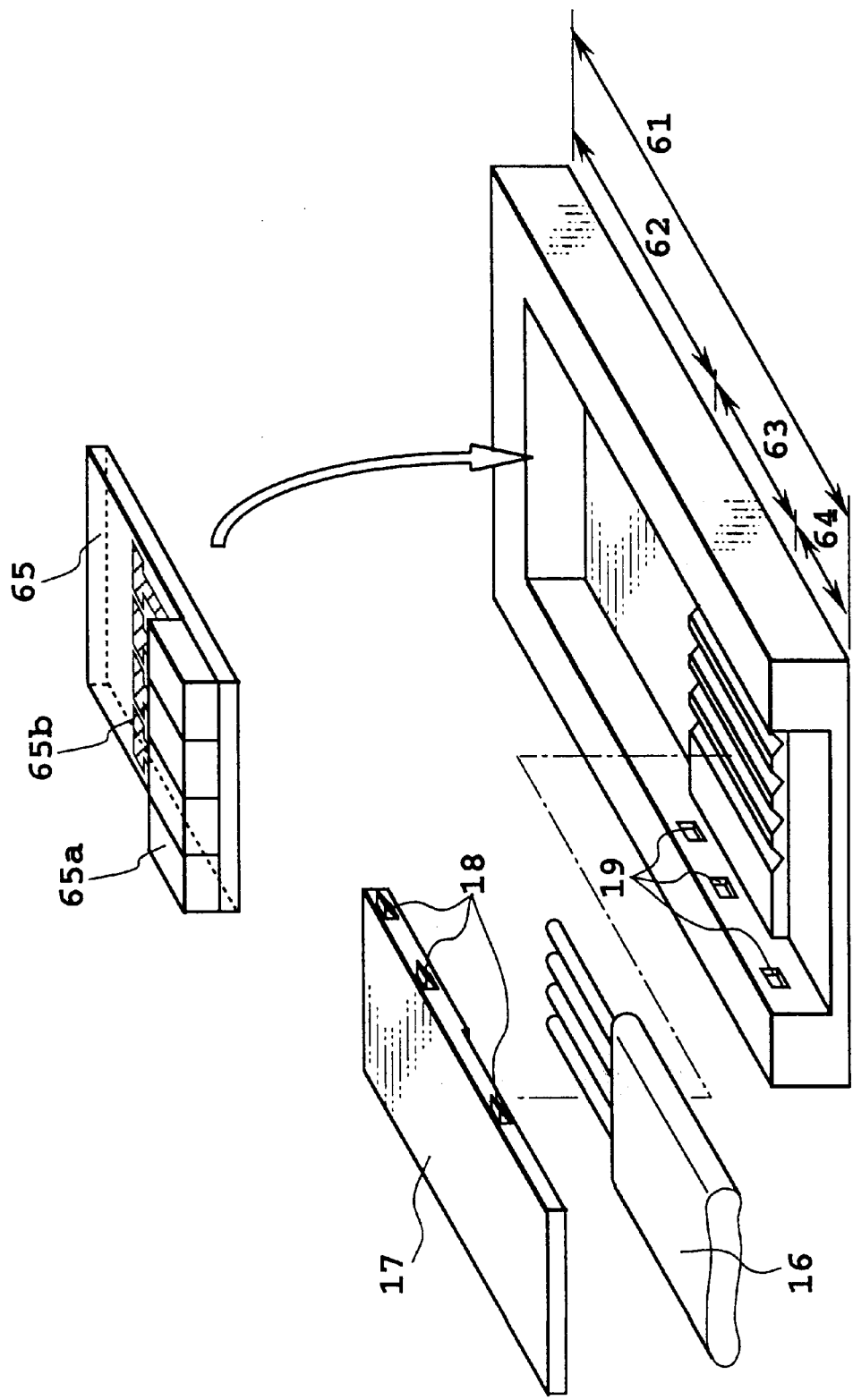
FIG. 8 is a perspective view showing a fifth embodiment of the present invention.

FIG. 8 shows the fifth embodiment of the invention. A module of this embodiment is characterised that an optical component 65 is comprised by forming a semiconductor lasar arry 65a and electrodes 65b on a Si substrate. The other constitution are the same as Embodiment 4, as well as materials used in the embodiment and a method for producing the module are the same as Embodiment 4.

Embodiment 6

Figure 9:
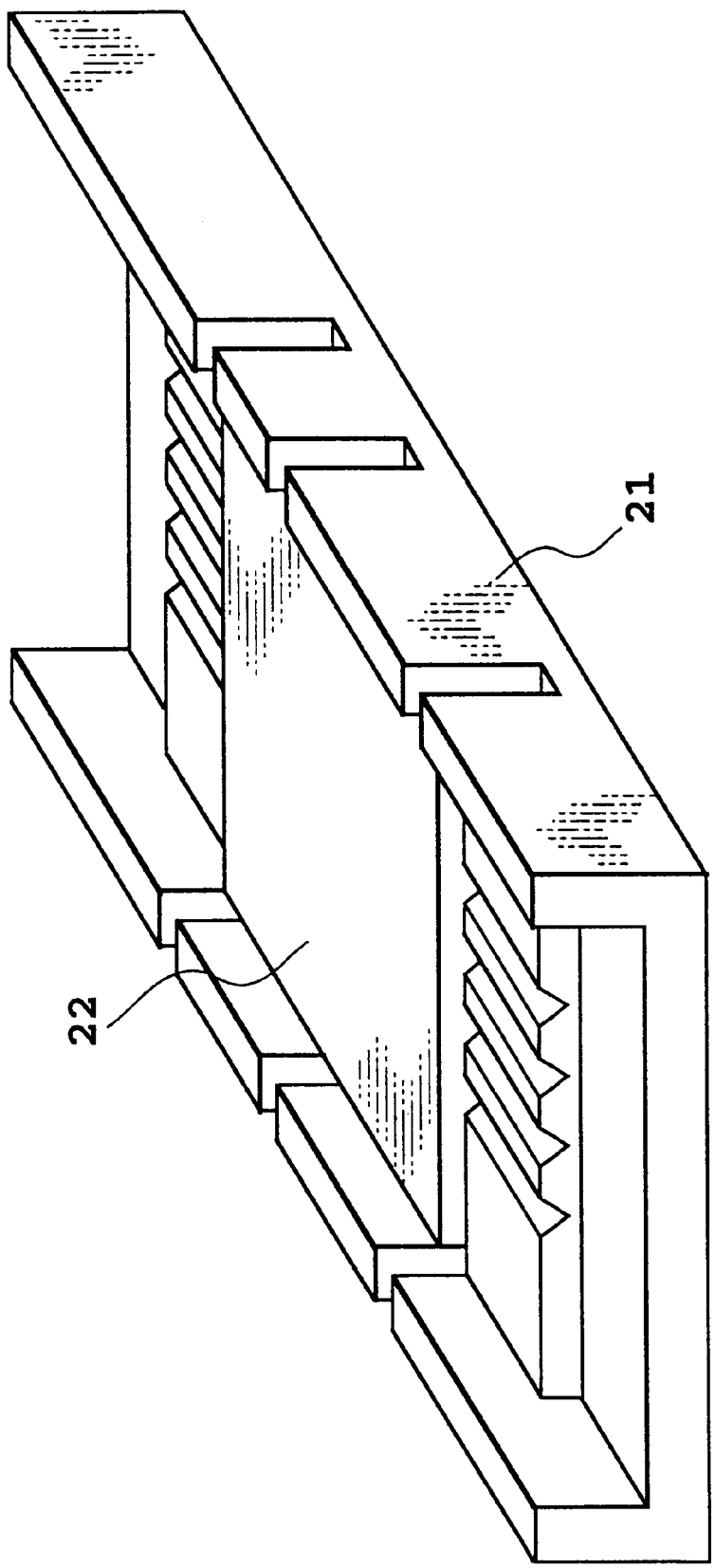
FIG. 9 is a perspective view of an optical module related to a sixth embodiment of the present invention.
Figure 10:
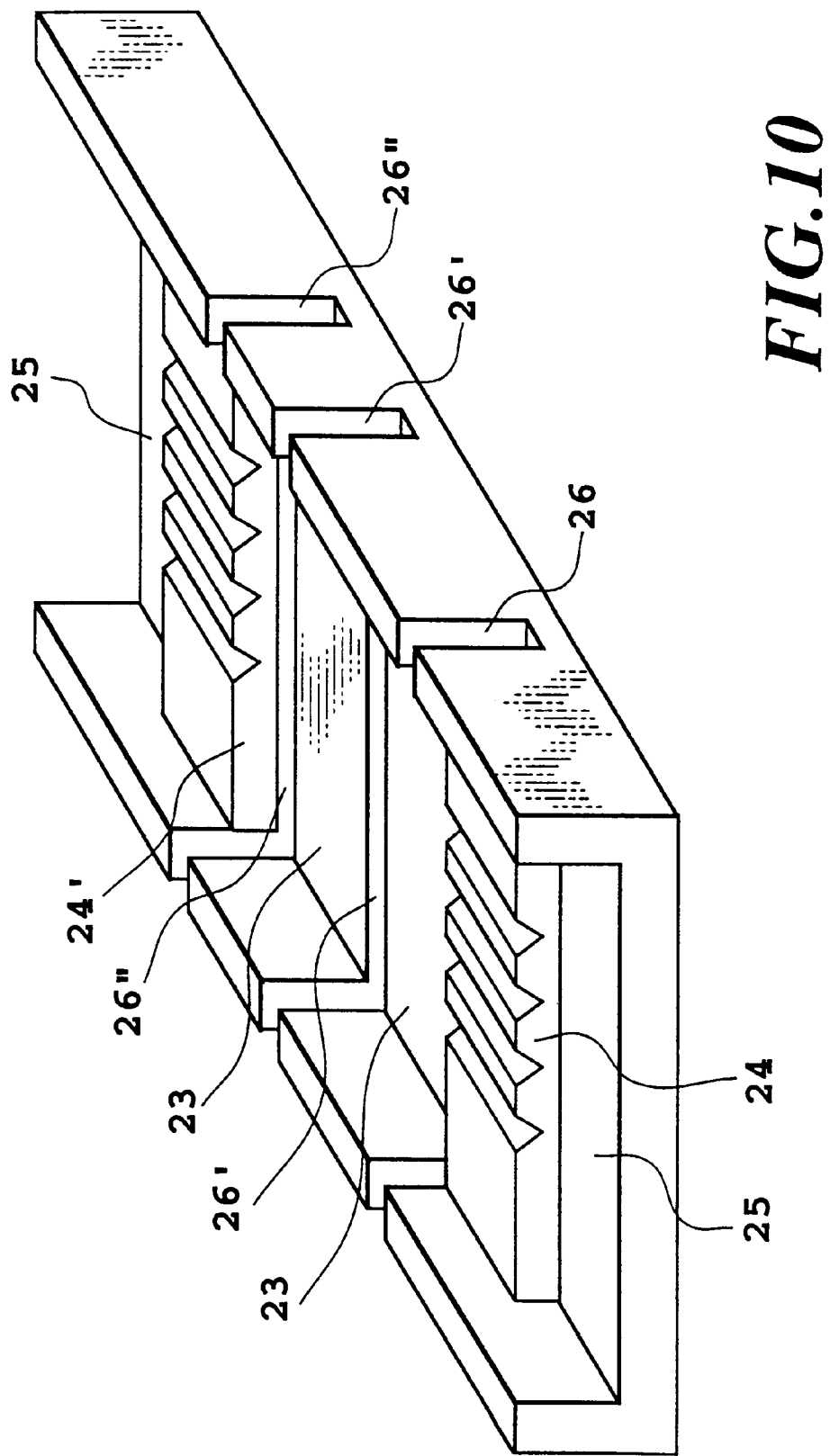
FIG. 10 is a perspective view of a packaging platform related to the sixth embodiment of the present invention.

FIGS. 9 and 10 show an optical module related to the sixth embodiment of the invention.

This embodiment, as illustrated in FIG. 9, comprised an injection molded packaging platform 21, and an optical component 22 inserted into and fixed by adhesive to the packaging platform 21.

The packaging platform 21, as shown in FIG. 10, was composed of a concave structure (reference structure portions) 23 for positioning and fixing, V-groove portions (fiber positioning portions) 24, 24' capable of holding and connecting optical fibers in an array, concave portions 25, 25' for accommodating and fixing the coating of optical fiber ribbons enclosing a multiplicity of optical fibers, and grooves 26, 26', 26" provided in the concave structure 23 for accommodating excess adhesive.

The specifications for a mold and the injection molding conditions for fabricating the packaging platform 21 were exactly the same as in the aforementioned Tables 1 and 2. The resin used in molding was silica-containing epoxy resin.

The dimensions of the grooves 26, 26', 26" provided in the concave structure 23 for accommodating excess adhesive were 200 μm width and 300 μm in depth from the concave structure 23.

The V-groove portions 24, 24' had a width of 40.3 μm, a guide groove depth of 121.5 μm, a guide groove angle of 60 degrees, and a guide groove interval of 250 μm. The dimensional accuracy of the mold was set at ±0.1 μm. Thus, the desired shape could be made with an accuracy of ±1 μm.

That is, the concave structure 23 was prepared with a dimensional accuracy of 1 μm, like the V-groove portions 24, 24', and could be molded in agreement with the dimensions of the light input and output portions of the optical component 22 to be inserted into the concave structure 23.

The polymer optical component relevant to the instant embodiment was prepared by the following packaging procedure:

First, the optical component 22 was placed on the packaging platform 21 shown in FIG. 9.

The optical component 22 was a polymer optical waveguide including a 4×4 optical star coupler.

This polymer optical waveguide was in a film form, and prepared in accordance with a method of forming a polymer optical waveguide circuit comprising a core and a cladding on a substrate having copper as a top layer, and then dipping this composite in an aqueous solution of hydrochloric acid to strip the polymer optical waveguide circuit portion from the substrate (Japanese Patent Application No. 127414/95).

The core material was prepared from deuterated PMMA, and the cladding was produced from UV curable epoxy resin.

The core size was 40 μm square, the distance from the bottom surface of the cladding to the core center was 75 μm, and the entire thickness was 150 μm.

The polymer optical waveguide was cut to a size of −5 μm±3 μm widthwise, and −10 μm±5 μm lengthwise, relative to concave structure 23 of the packaging platform 21.

Then, the UV curing adhesive was inserted through the groove 26', and the polymer waveguide 22 was lightly pressed from above with a metal piece 1 mm smaller in width and length than the polymer waveguide 22 to bring the polymer waveguide 22 and the concave structure 23 of the packaging platform 21 into intimate contact.

At this time, the excess adhesive flowed into the grooves 26, 26", and did not escape to the end faces of the V-groove portions.

Then, ultraviolet radiation was applied for 5 minutes to complete a polymer optical component of the instant embodiment.

The so prepared polymer optical component can be connected, with desired characteristics, to a four-fiber optical fiber ribbon, and an optical packaged product can be produced easily. These facts were confirmed by the following methods:

A pair of optical fiber ribbons were deprived of the coatings provided at the end, and were arranged and held in the V-groove portions 24, 24'.

Then, the pair of optical fiber ribbons were pressed against the V-groove portions 24, 24' by press covers of glass from above. An ultraviolet curing adhesive was flowed into the V-groove portions 24, 24' to adhere and fix the optical fiber ribbons to the optical packaging component of the instant embodiment having the polymer waveguide mounted thereon.

On this occasion, the cores of the polymer waveguides and the cores of the fiber ribbon completely agreed without a special alignment procedure. Connection loss was evaluated using a laser light source having a wavelength of 0.85 μm and a photodiode. The connection loss was about 0.5 dB, thus permitting easy connection with low connection loss fibers.

Embodiment 7

Figure 11:
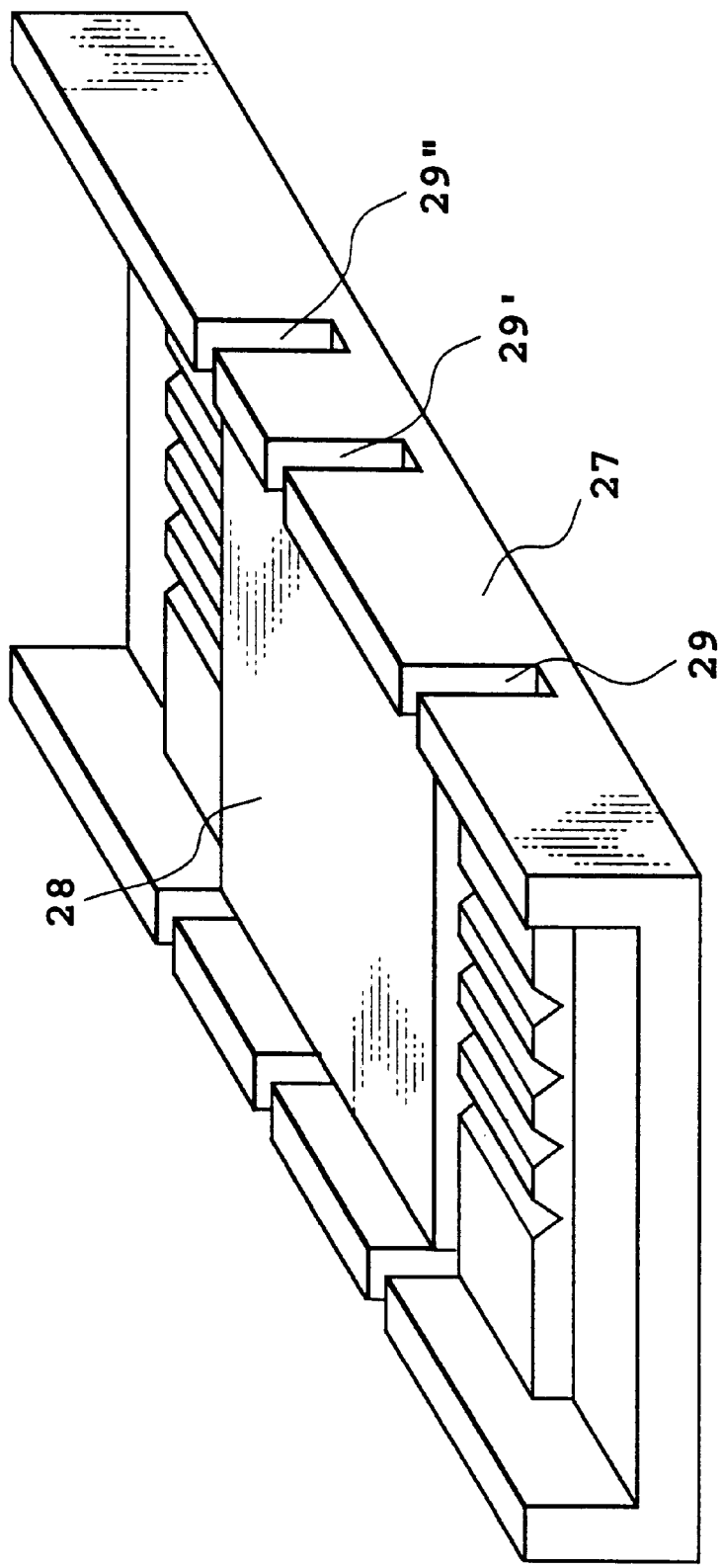
FIG. 11 is a perspective view of an optical module related to a seventh embodiment of the present invention.

FIG. 11 shows a polymer optical component related to the seventh embodiment of the invention.

The polymer optical component of this embodiment comprised an injection molded packaging platform 27, and a polymer waveguide 28 inserted into the packaging platform 27 and having two sets of Y-branching waveguides fixed by adhesive to the packaging platform 27.

The packaging platform 27 was the same as shown in FIG. 10 and prepared by the same method as described in Embodiment 6.

The polymer optical component relevant to the instant embodiment was produced by the following packaging procedure:

First, the polymer waveguide 28 having the two sets of Y-branching waveguides was placed on the packaging platform 27.

This polymer optical waveguide was in a film form, and prepared in accordance with a method of forming a polymer optical waveguide circuit comprising a core and a cladding on a substrate having copper as a top layer, and then dipping this composite in an aqueous solution of hydrochloric acid to strip the polymer optical waveguide circuit portion from the substrate (Japanese Patent Application No. 127414/95).

The core material was prepared from deuterated MMA, and the cladding was produced from UV curable epoxy resin.

The core size was 40 $\mu$m square, the distance from the bottom surface of the cladding to the core center was 75 $\mu$m, and the entire thickness was 150 $\mu$m.

The polymer optical waveguide was cut to a size of –5 $\mu$m±3 $\mu$m widthwise, and –10 $\mu$m±5 $\mu$m lengthwise, compared with concave structure of the packaging platform.

Then, a UV curing adhesive was inserted through a groove 29, and the polymer waveguide 28 was lightly pressed from above with a metal piece 1 mm smaller in width and length than the polymer waveguide 28 to bring the polymer waveguide and the concave structure of the packaging platform 27 into intimate contact.

At this time, the excess adhesive flowed into grooves 29, 29", and did not escape to the end faces of the V-groove portions.

Then, ultraviolet radiation was applied for 5 minutes to complete a polymer optical component of the instant embodiment.

The so prepared polymer optical component can be connected, with desired characteristics, to a four-fiber optical fiber ribbon, and an optical packaged product can be produced easily. These facts were confirmed by the following methods:

On the input side, the two optical fibers at the center of the four fibers of a four-fiber optical fiber ribbon were connected to the cores of the polymer waveguide on the input side of the two branches. On the output side, the four optical fibers of another four-fiber optical fiber ribbon were connected to the four cores of the polymer waveguide located on the output side.

In other words, a pair of the optical fiber ribbons were deprived of the coatings provided at the end, and were arranged and held in the V-groove portions.

Then, the pair of optical fiber ribbons were pressed against the V-groove portions by press covers of glass from above. An ultraviolet curing adhesive was flowed into the V-groove portions to adhere and fix the optical fiber ribbons to the optical packaging component of the instant embodiment having the polymer waveguide mounted thereon.

On this occasion, the cores of the branching waveguides of the polymer waveguide and the cores of the fiber ribbons nearly agreed without a special alignment procedure. Connection loss was evaluated using a laser light source having a wavelength of 0.85 $\mu$m and a photodiode. The connection loss was about 0.5 dB, thus permitting easy connection with low connection loss fibers.

The two waveguides of the Y-branching devices were also confirmed to contain input light in a nearly 1:1 branched state.

The above two embodiments gave examples of a polymer optical waveguide as a branching waveguide or a star coupler for branching and merging light regardless of its wavelength. Clearly, however, an optical waveguide circuit having a demultiplexing function and a multiplexing function may be mounted, such as a Mach-Zehnder interferometer or an arrayed waveguide grating which has strongly wavelength-dependent branching/merging characteristics.

Embodiment 8

Figure 12:
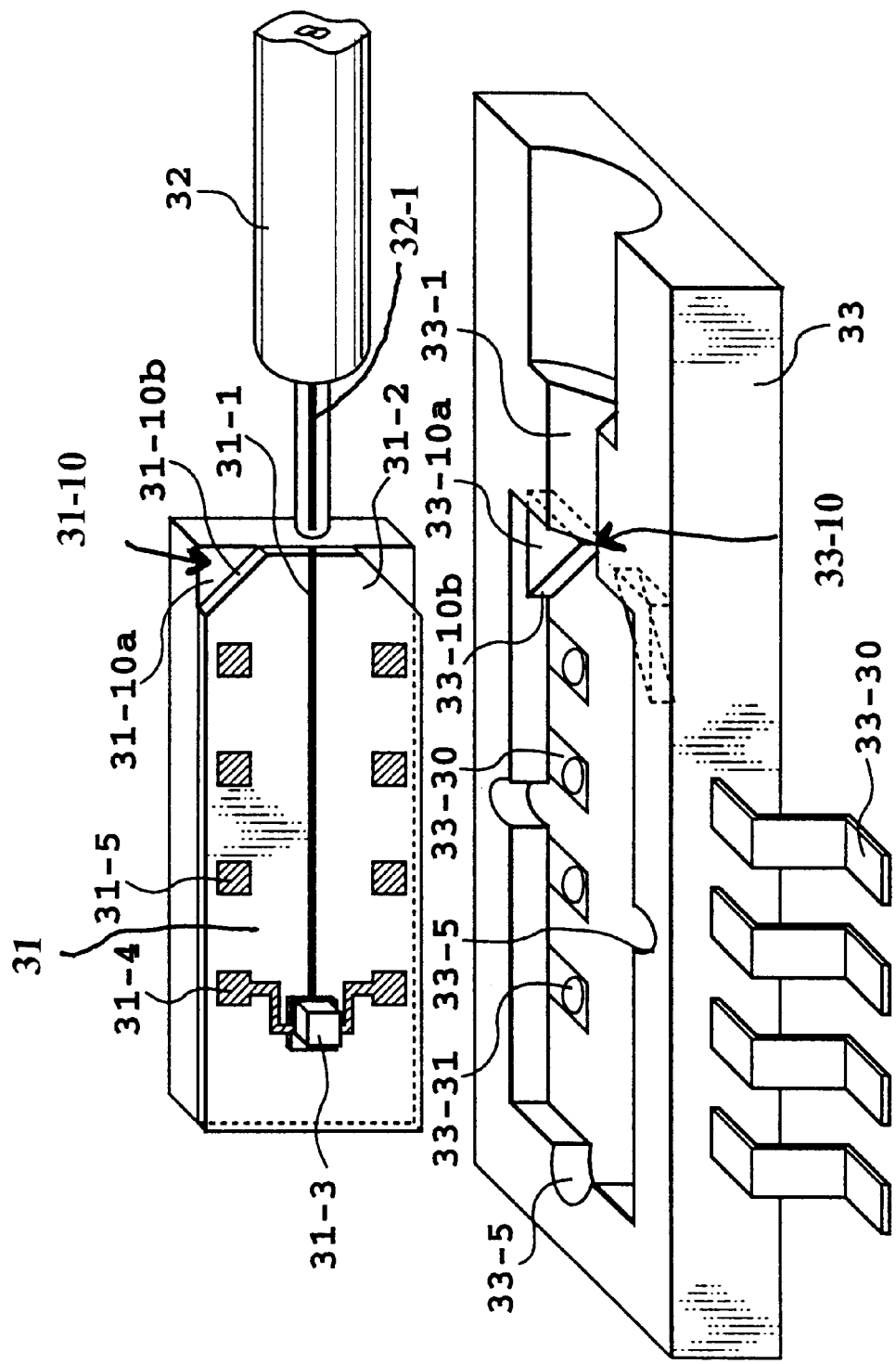
FIG. 12 is a view for illustrating a eighth embodiment of the present invention, as a perspective view of an optical module related to the present invention in which an optical component with laser integrated in an optical waveguide is mounted on a packaging platform having an alignment structure, and as a view showing the state of the optical component before being placed on the packaging platform so that the surface of the optical component can be seen.
Figure 13:
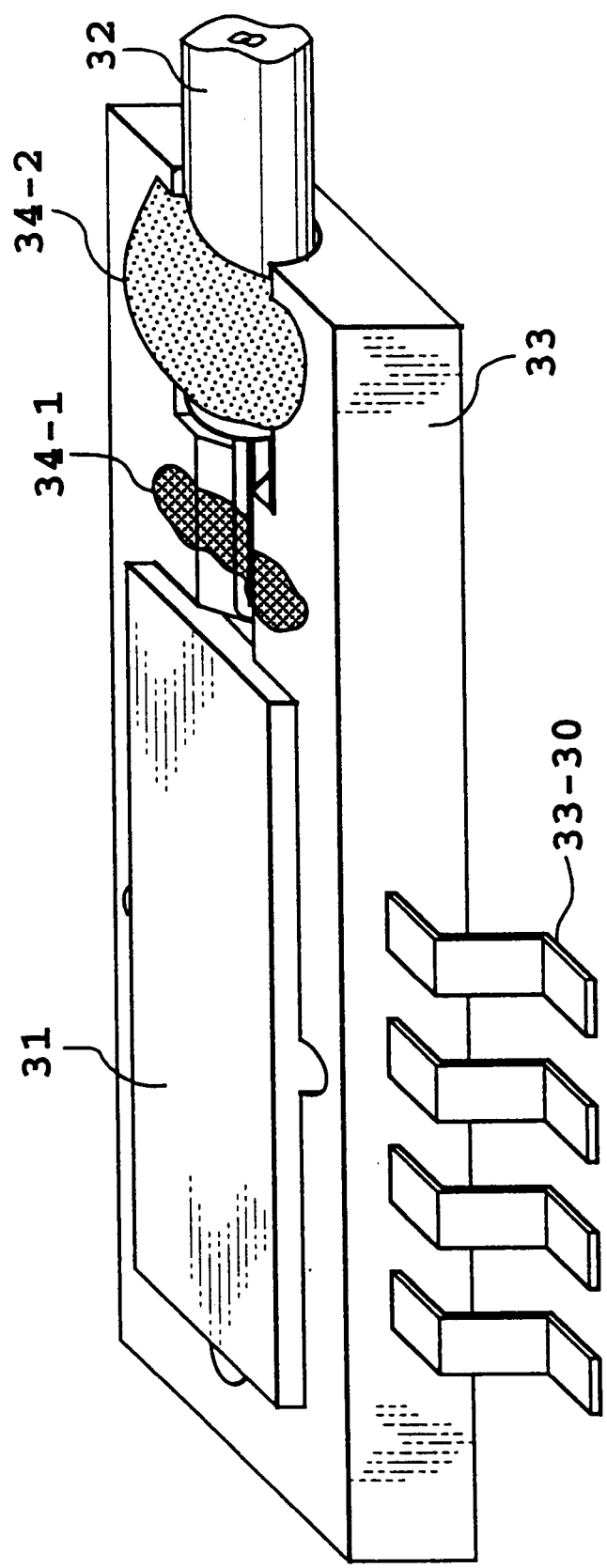
FIG. 13 is a perspective view of the same optical module as in FIG. 12, showing the state of the optical component placed on the packaging platform, with an optical fiber being fixed in a pigtail form.
Figure 14:
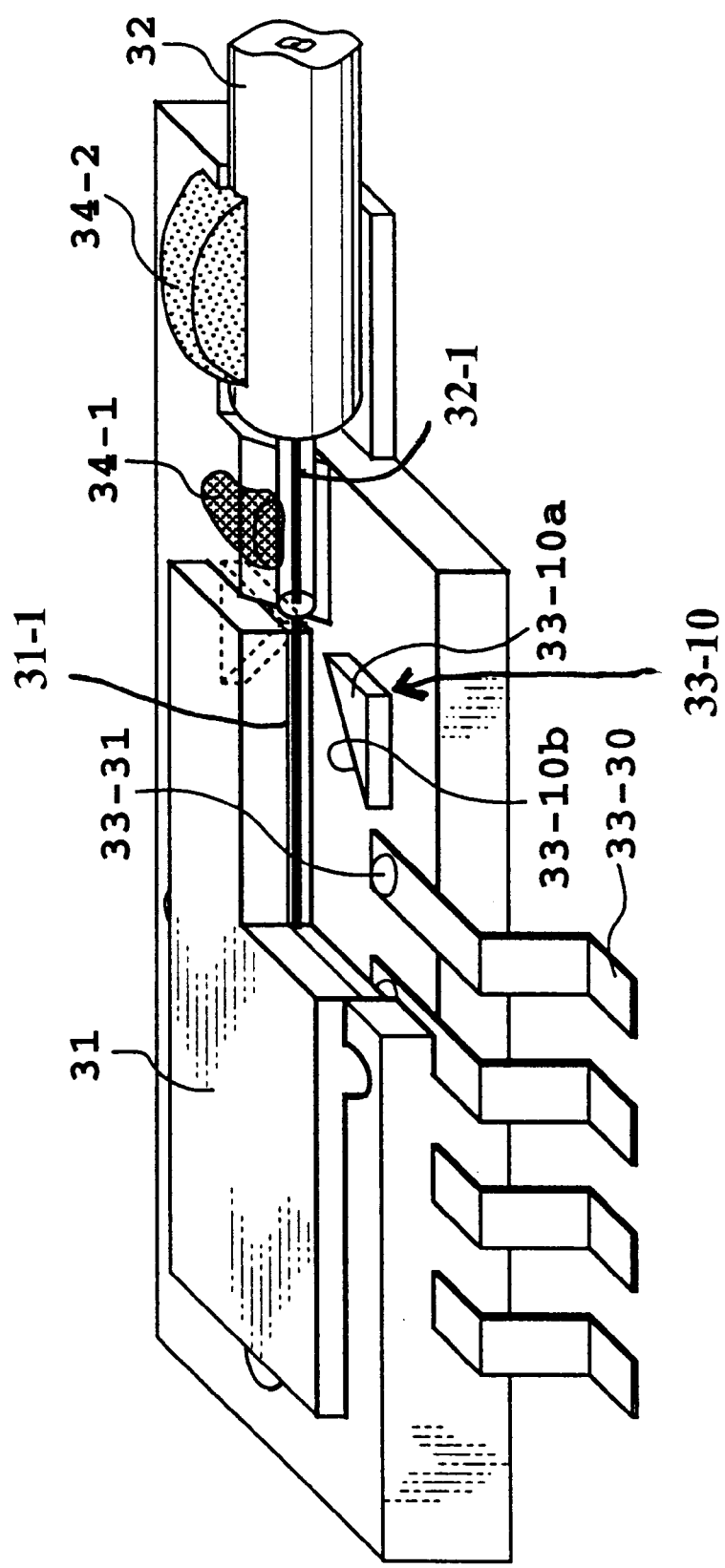
FIG. 14 is a perspective view of the same optical module as in FIG. 13, as a partly sectional view showing a state in which the optical axes of the optical waveguide and the optical fiber are registered with each other.

FIGS. 12, 13 and 14 are perspective views showing a packaging platform and an optical module using it, as the seventh embodiment of the present invention. The materials used were the same as in Embodiment 1, and molded by injection molding. All the dimensional accuracies were within ±1 $\mu$m.

In the drawings, the numeral 33 denotes a packaging platform composed of a fiber positioning groove 33-1, a protruding guide 33-10, and leads 33-30 using lead frames as electrical wirings. The upper surface 33-10a served as a height reference surface, while its oblique side surface 33-10b constituted a horizontal reference surface (engagement surface). The position and dimensions of the fiber positioning groove 33-1 were set at predetermined values accurate to about 1 $\mu$m relative to the height reference surface 33-10a and the horizontal reference surface 33-10b. Thus, when an optical fiber 32 is inserted into the fiber positioning groove 33-1, the position of the core center of the optical fiber 32 can be determined with an accuracy of about 1 $\mu$m relative to the height reference surface 33-10a and the horizontal reference surface 33-10b.

The numeral 31 denotes an optical component which, concretely, includes a silica optical waveguide comprising an optical waveguide core 31-1 and a cladding 31-2 on an Si substrate. In this embodiment, the optical waveguide core 31-1 constituted a straight waveguide, and a laser diode 31-3 was mounted on an optical device mounting portion formed by partially removing the cladding portion 31-2 by etching to make a laser optical module. On the surface of the substrate, an electrical wiring 31-4 for driving the laser diode 31-3 was provided, and a pad for electrical connection with the packaging platform 33 was provided forward of the electrical wiring. In the remaining portion, a radiating land 31-5 was provided to permit heat to escape the packaging platform 33. The positional relationship of a horizontal reference surface 31-10b of an alignment guide 31-10 to the connecting pad of this electrical wiring pattern was set at a predetermined value accurate to about 1 $\mu$m.

The cladding near the end of the optical waveguide substrate had been processed in an oblique form by removal by etching. This oblique engagement surface 31-10b functioned as a horizontal reference surface for the optical component 31, while a bottom surface 31-10a of the alignment guide 31-10 formed by etching functioned as a height reference surface. The horizontal position and height from the height reference surface to the optical waveguide core center were determined with an accuracy of about 1 $\mu$m relative to predetermined values. The positional relationship of a pad for the electrode pattern to the horizontal reference surface was also determined with an accuracy of about 1 $\mu$m. As described above, the main constituents on the packaging platform 33 and the optical component (i.e., optical fiber positioning groove 33-1, electrical wiring pattern 31-4, optical waveguide core 31-1, leads 33-30) were determined accurately to have predetermined design values relative to the height and horizontal reference surfaces provided in both of the packaging platform 33 and the optical component 31.

Figure 15:
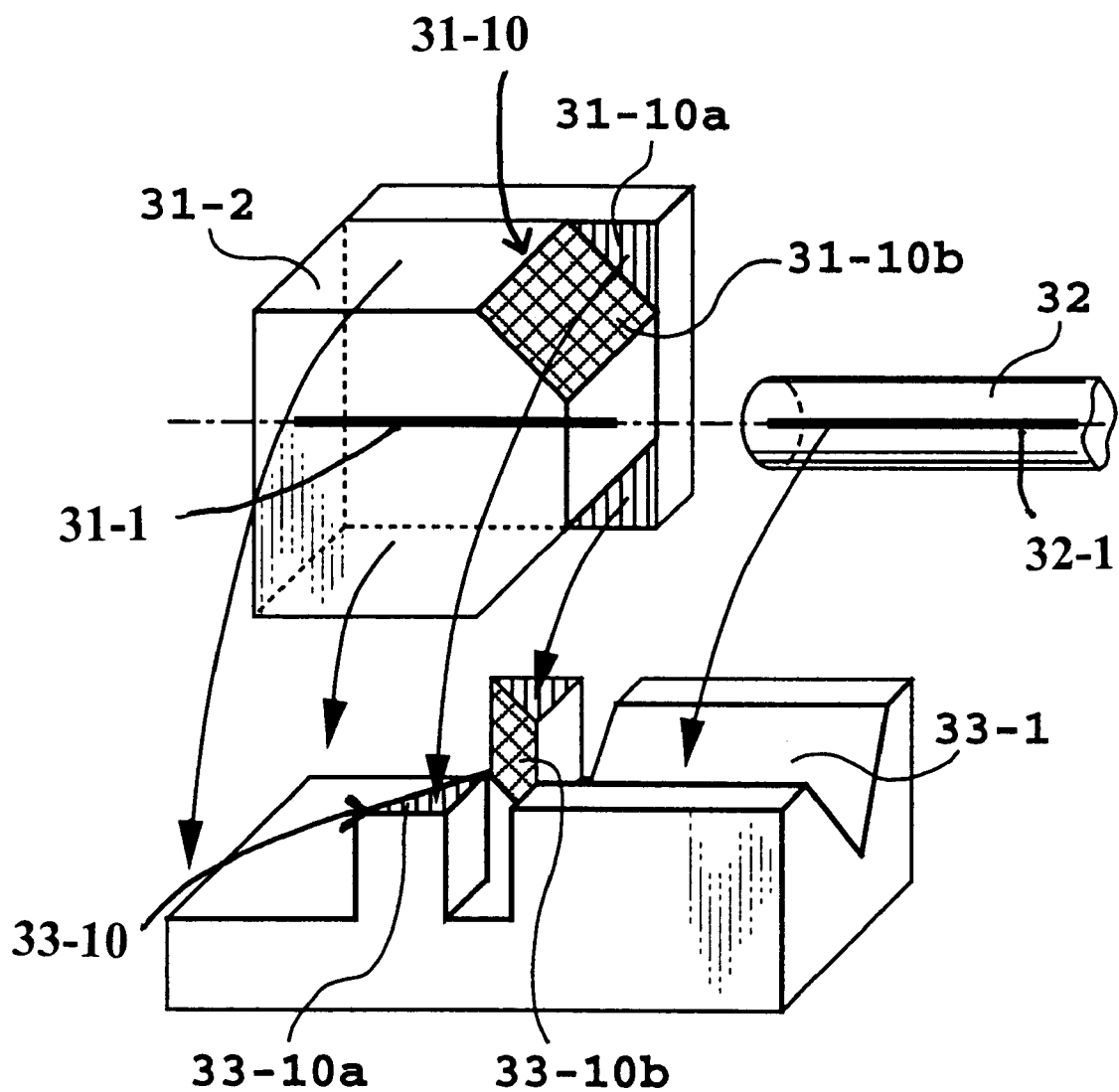
FIG. 15 is a perspective view showing the vicinity of an alignment structure portion of the optical module of the present invention, showing the state of the optical component before being placed on the packaging platform so that the surface of the optical component can be seen.
Figure 16:
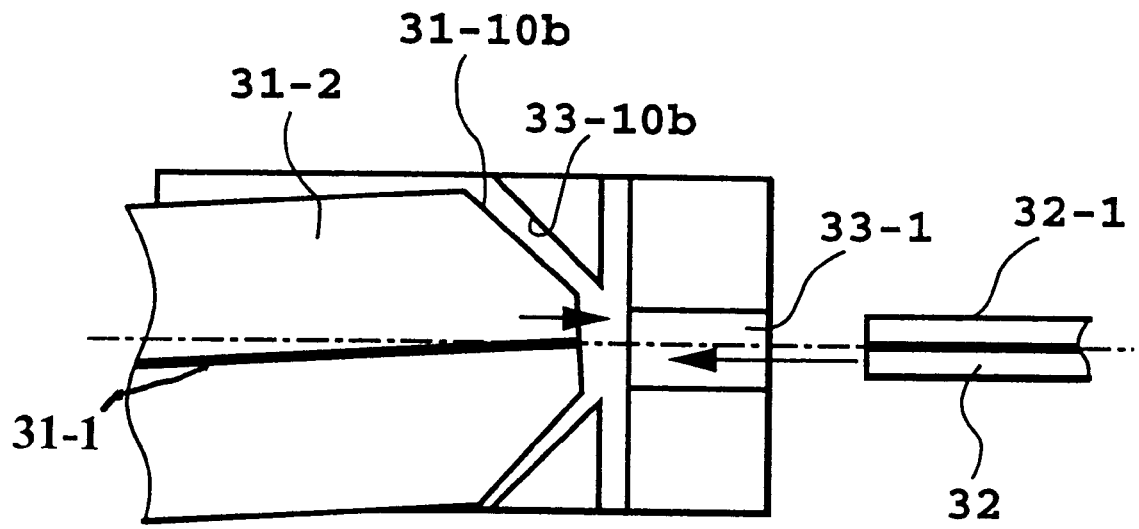
FIG. 16 is a plan view showing the same vicinity of the alignment structure portion of the optical module as in FIG. 15, illustrating alignment in the horizontal direction.
Figure 17:
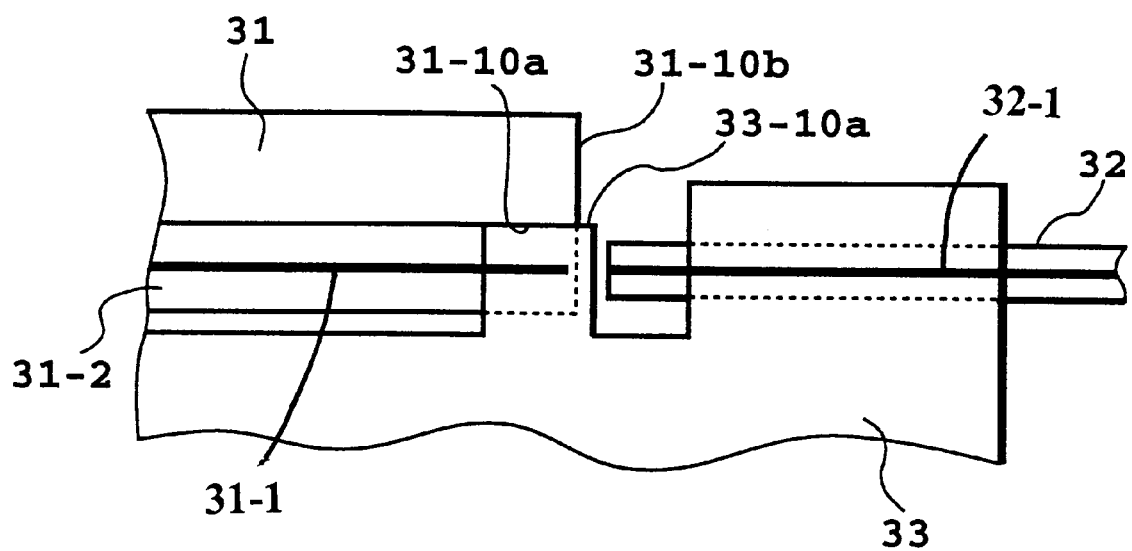
FIG. 17 is a side view showing the same vicinity of the alignment structure portion of the optical module as in FIGS. 15 and 16, illustrating alignment in the altitudinal direction.

The method of alignment using the above constituents is shown in FIGS. 15, 16 and 17. FIG. 15 is a perspective view of the vicinity of the reference surface, FIG. 16 is a plan view thereof, and FIG. 17 is a side view thereof.

In this embodiment, the clad part of both sides of the optical waveguide core 31-1 of the optical component were processed in an oblique form, and the oblique engagement surfaces 31-10b were arranged linearly symmetrically with respect to an axis parallel to the optical axis of exit light from the optical waveguide. For further simplification, the drawing shows a case in which the linear symmetric axis and the optical axis agreed, but this agreement is not necessarily required. If excessive etching was done, the cladding portions on both sides would be equally scraped, and deviation of the axis of the optical waveguide from the optical axis would not occur. The alignment guide 33-10 for the packaging platform 33 was obliquely processed in agreement with alignment guide 31-10. Clearly, this processing gives the same geometrical characteristics as in the optical waveguide substrate.

Using the foregoing structure, alignment between the optical waveguide core 31-1 and the optical fiber core 32-1 was carried out. Alignment in the horizontal direction by the horizontal reference surfaces 31-10b, 33-10b is shown in FIG. 16. The height reference surfaces 31-10a and 33-10a of the optical waveguide and the packaging platform 33 were pressed against each other, and the optical waveguide substrate was slid forward for horizontal alignment. When the horizontal reference surfaces contacted each other, and finally settled down, the optical axis of the optical waveguide 31-1 agreed with the center of the fiber positioning groove 33-1. At this time, the optical fiber 32 was fitted into the fiber positioning groove 33-1, whereby alignment on a horizontal plane was automatically completed for the optical waveguide 31-1 and the optical fiber core 32-1.

Alignment by the height reference surfaces 31-10a, 33-10a is illustrated in FIG. 17. The height reference surfaces 31-10a and 33-10a of the optical component 31 and the packaging platform 33 were pressed against each other, whereby the positional relationship for height was determined between the height of the optical fiber 32 placed in the fiber positioning groove 33-1 and the height of the optical waveguide. If, based on this relationship, the distance of the optical waveguide core 31-1 from the eight reference surface 31-10a is conformed to the distance of the optical fiber core 32-1 from the height reference surface 31-10a, the heights of the optical fiber core 32-1 and the optical waveguide core 31-1 would agree. For an optical waveguide including an electric circuit as in the embodiment shown in FIGS. 12, 13 and 14, opposed electrical pads are formed in the optical component 31 and the packaging platform 33, and an electrode withdrawing structure such as solder bumps 33-31 and 33-30 is used. By so doing, electrical connection can be obtained easily. Since the accuracy of alignment is about 1 μm, moreover, packaging of this type easily becomes possible even for an optical waveguide with a fine electrode pattern.

In this embodiment, the fixing of the optical component onto the packaging platform by means of solder bumps is performed by applying an adhesive or solder with the reference surfaces being pressed against each other, and holding this state until the adhesive or solder becomes cured. The use of solder bumps is advantageous in that this holding step can be omitted. The reasons are illustrated in FIG. 18A.

Figure 18A:
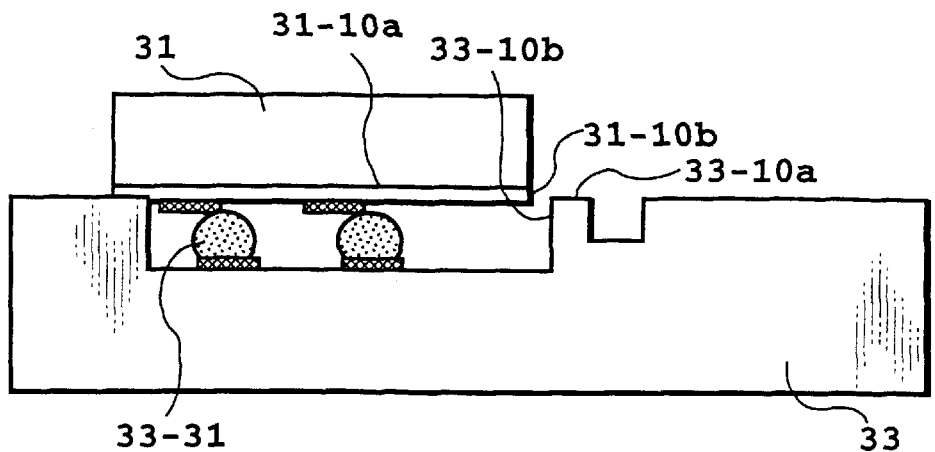
FIG. 18A to 18C are views for illustrating the reason why the use of solder bumps in fixing the optical component onto the packaging platform makes it possible to omit a holding step which is otherwise performed until the solder is cured.

FIG. 18A is a sectional view of the area of bonding of a packaging platform 33 with solder bumps 33-31 to an optical component 31. The optical waveguide, optical fiber and optical device are not shown. In the embodiment, the horizontal reference surface is a vertical wall running obliquely relative to the optical axis, but was indicated as a simple vertical wall for easy understanding. Alignment using the packaging platform 33 is performed by forcing the optical component 31 toward the packaging platform 33 in a downward, rightward direction on the sheet face of the drawing, and pressing the reference surfaces 31-10a and 33-10a against each other, and the reference surfaces 31-10b and 33-10b against each other.

Figure 18B:
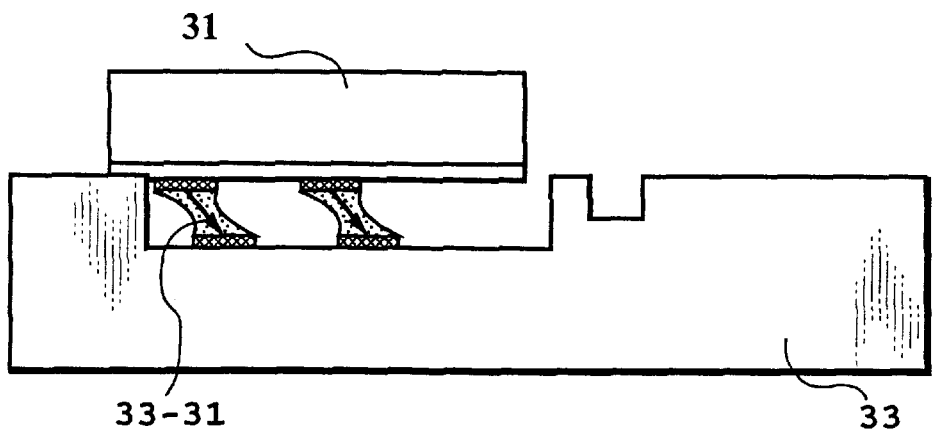
Figure 18C:
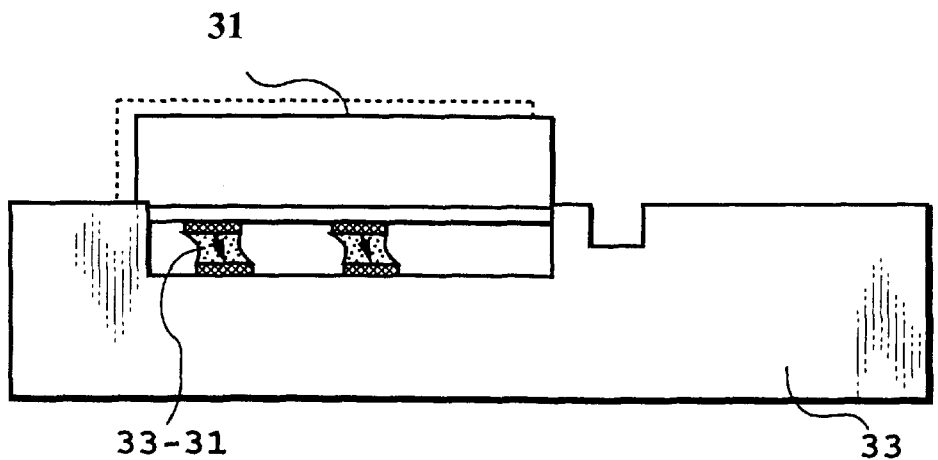

The use of the solder bumps 33-31 is accompanied, beforehand, by forming an electrode pad of the packaging platform 33 rightward of an electrode pad of the optical component 31, and adjusting the amount of the solder, so that the solder will pull the pad of the optical component 31 downward. When the solder is melted, the surface tension works, causing the optical component 31 to be automatically pressed in the downward, rightward direction on the sheet face of the drawing as shown in FIGS. 18B and 18C. When the solder is cooled in this state, the optical component 31 and the packaging platform 33 can be fixed to each other with the reference surfaces in contact, without holding the optical component 31 by means of a packaging apparatus. When the solder bumps are used, the shape of the electrical pad or the solder bump may be inappropriate, or the surface of the solder bump may be oxidized and resistant to surface tension. However, if the optical waveguide is held by a packaging apparatus or the like, the effect of surface tension can be suppressed and easy packaging is possible.

In this embodiment, the horizontal reference surface oblique relative to the optical axis was used. However, if a horizontal reference surface parallel to the optical axis is present on each of the optical waveguide and the packaging platform, the high accuracy adjustment of the distance between the horizontal reference surface and the optical waveguide and between it and the optical fiber array structure would enable the optical axes of the optical waveguide and the optical fiber in the horizontal direction to be coaxial easily.

The optical module illustrated in FIGS. 13, 14, 15, 16 and 17 is an optical module after completion of assembly by a pigtail type optical fiber fixing method. The optical fiber 32 was placed on the fiber positioning portion 33-1 on the packaging platform 33. Then, an adhesive 34-1 was put on the optical fiber 32 for fixation, and the coated portion of the optical fiber was fixed to the packaging platform 33 with an adhesive 34-2. The optical waveguide 31 was fixed by the use of an adhesive applied very thinly to the height reference surface 33-10 and solder bumps 33-31, although this is not shown. At this time, the optical waveguide 31 is pressed down toward the right on the sheet face of the drawing for fixation onto the packaging platform 33. By this measure, the optical fiber can be aligned with the optical waveguide in the direction of height and on the horizontal plane as has been stated previously. Fixation then becomes possible without misalignment, as shown in FIG. 14 as a sectional view.

Figure 19:
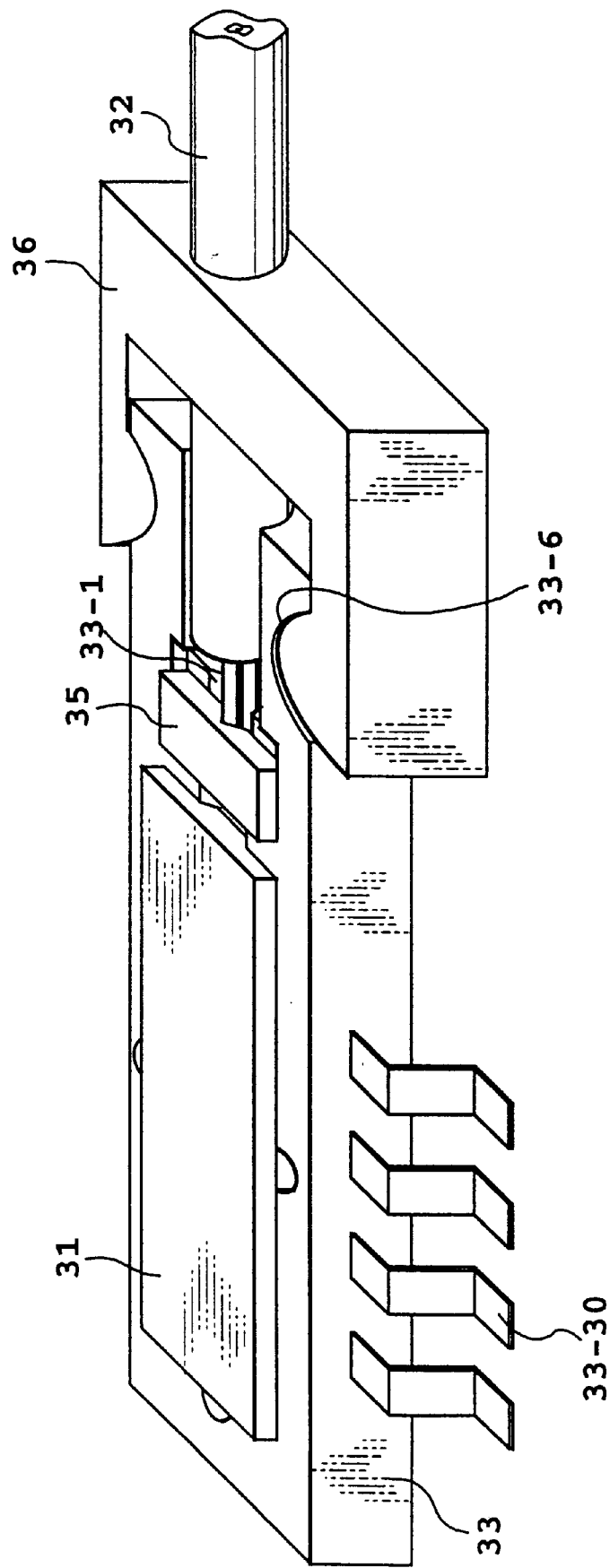
FIG. 19 is a perspective view of an optical module related to the present invention using a detachable structure for the fixing of an optical fiber, showing the state of the optical component placed on the packaging platform.
Figure 20:
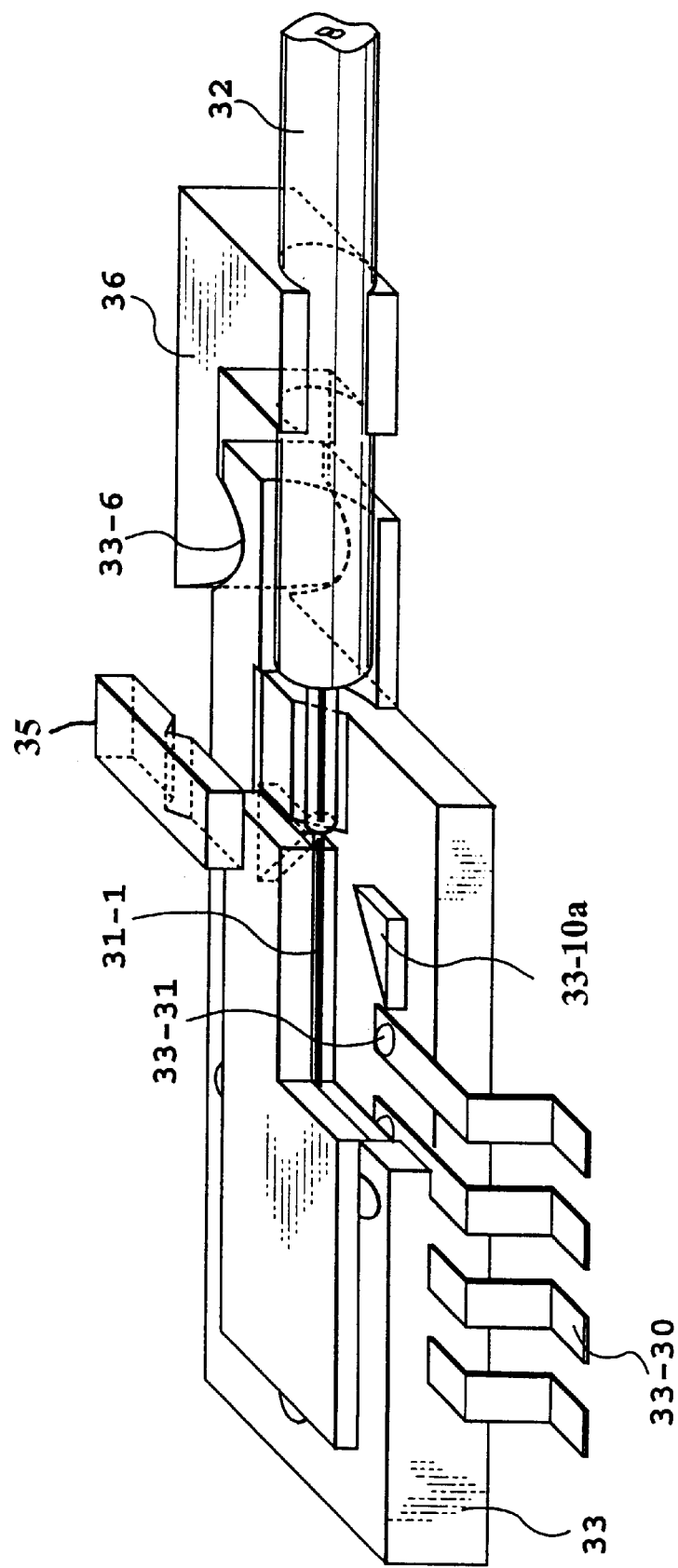
FIG. 20 is a partly sectional perspective view of the same optical module as in FIG. 19, showing a state in which the optical axes of the optical waveguide and the optical fiber are registered with each other.

FIGS. 19 and 20 show an optical module of the type in which an optical fiber is inserted after mounting a packaging platform and an optical component to each other. FIG. 19 illustrates an assembled state, and FIG. 20 is a sectional view thereof. In this case, a press plate 35 with a V-groove adapted to fiber dimensions is fixed on a fiber positioning portion 33-1 to provide a hole-like structure for guiding a fiber 32. By so doing, the optical fiber 32 can be inserted into the grooved portion 33-1 where necessary, to obtain optical coupling with an optical waveguide 31. In this embodiment, a hook 36 was attached to the optical fiber, and a packaging platform 33 with a retiring part 33-6 to be fitted to the hook 36 was used to make a structure capable of detachable mounting of the optical fiber 32.

Embodiment 9

Figure 21:
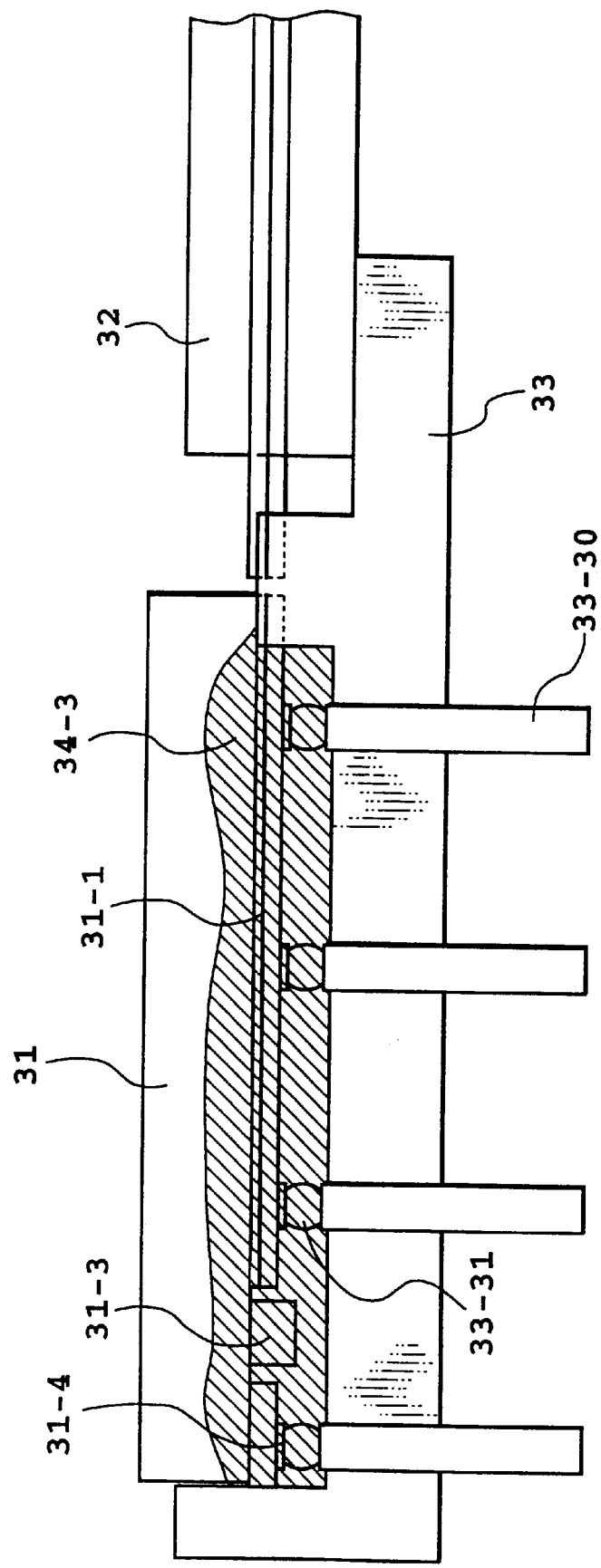
FIG. 21 is a partly sectional side view of an optical module of a ninth embodiment of the present invention, showing an example of sealing with resin.
Figure 22:
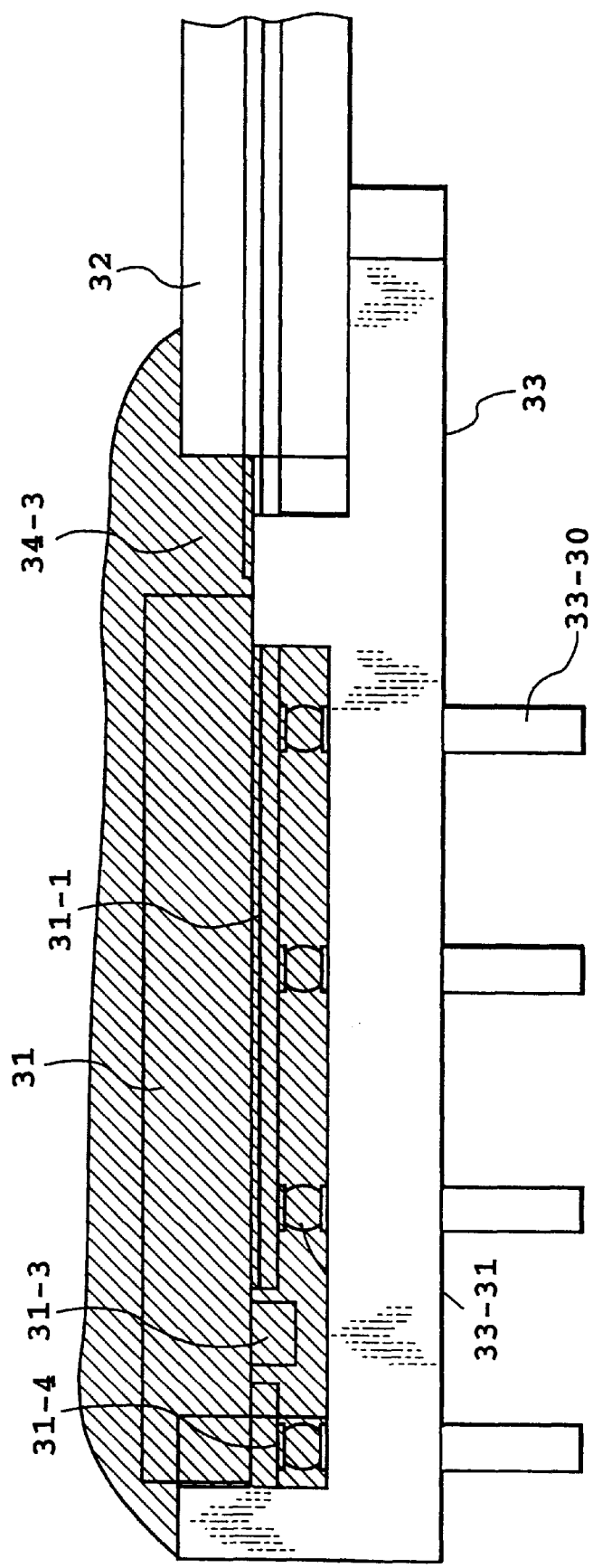
FIG. 22 is a partly sectional side view of the optical module of the ninth embodiment of the present invention, showing an example of a constitution in which the optical module including an optical fiber is sealed with transparent resin.

FIG. 21 shows an example of a sealing structure of an optical module of the type in which a resin is poured between an optical waveguide substrate 31 and a packaging platform 33. This sealing method is effective in providing a seal for protection of an electrode, an electrical wiring, etc. The reason is as follows: To enhance a sealing effect, as small a sectional area of a resin layer as possible is desirable; the resin has some moisture permeability, so that the larger the sectional area of the resin layer, the easier the penetration of water molecules becomes. According to the present invention, the packaging platform 33 substantially plays the role of a cover for the optical component, thus making it possible to thin a layer of resin to be penetrated into the gap. Because of this, the optical module of the invention enables sealing with resin to exhibit very high reliability. The sealing resin may be a transparent resin or an opaque resin. When a transparent resin is used, it may be flowed into the junction between the optical fiber and the optical waveguide, and can function as a refractive index aligner as well as a sealant. This example is illustrated in FIG. 22.

Figure 23:
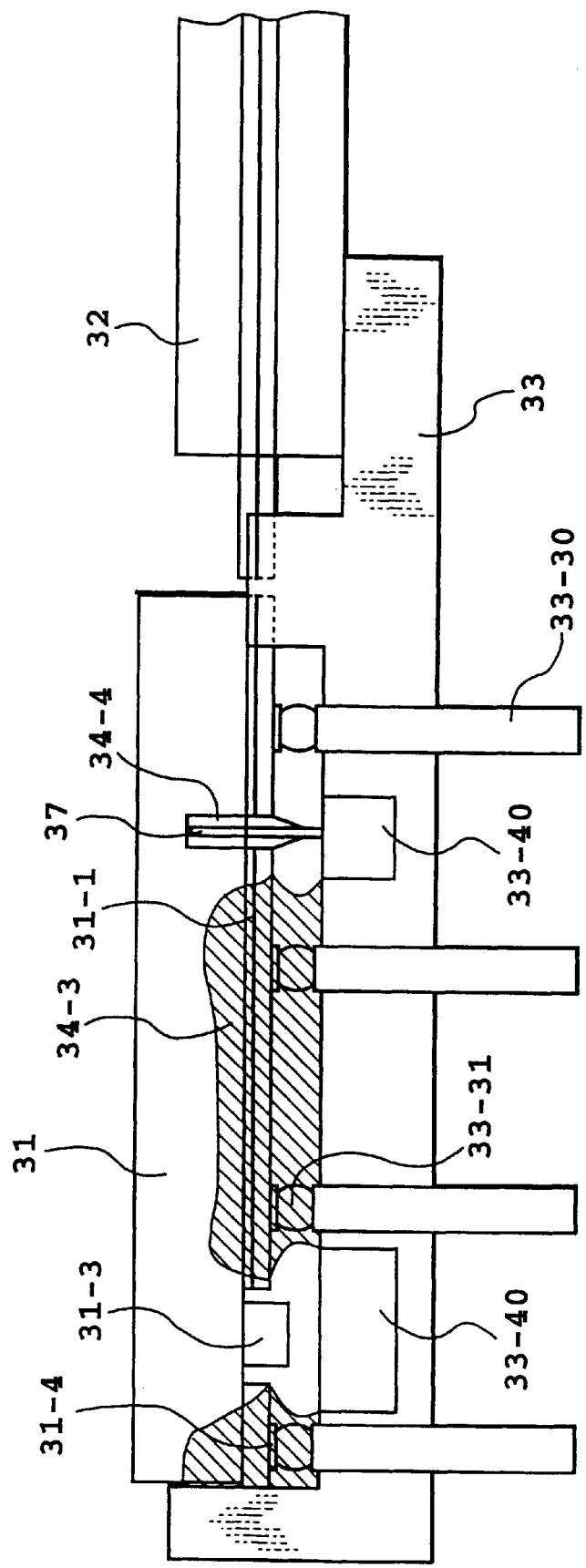
FIG. 23 is a partly sectional side view of the optical module of the ninth embodiment of the present invention, showing a structure for stopping the flow of the resin.

FIG. 23 shows an example of an optical module sealed with resin injected into a gap between an optical waveguide substrate 31 and a packaging platform 33, constructed such that the resin does not enter a part of the gap. In this embodiment, the resin has affinity for the optical waveguide substrate 31 and packaging platform 33. Thus, the embodiment utilized the feature of the sealing resin that because of surface tension, the resin naturally deforms into such a shape that its portion in touch with the air shrinks. This means a configuration in which flowing of the sealing resin into part of the gap is suppressed by providing the packaging platform 33 or the optical waveguide substrate 31 with a structure 33-40 for widening the gap between the optical waveguide substrate 31 and the packaging platform 33 by a sharp-angled difference in level. This effect always holds if the affinity of the resin for the surface, though not the air, is sufficiently low. By this method, the sealing resin can be prevented from contacting the optical device, because of refractive index, etc., or can be prevented from escaping to an optical component, such as a film-shaped optical component 37, which is susceptible to influence from stress because of its shape. This embodiment has given consideration to a case in which the optical module may be heated, although not shown. To avoid the situation that a hollow surrounded by the resin may be formed in the gap, there was used a packaging platform of a structure in which there is no resin-surrounded portion by the use of a groove as shown in FIGS. 9, 10 and 11.

Embodiment 10

Figure 24:
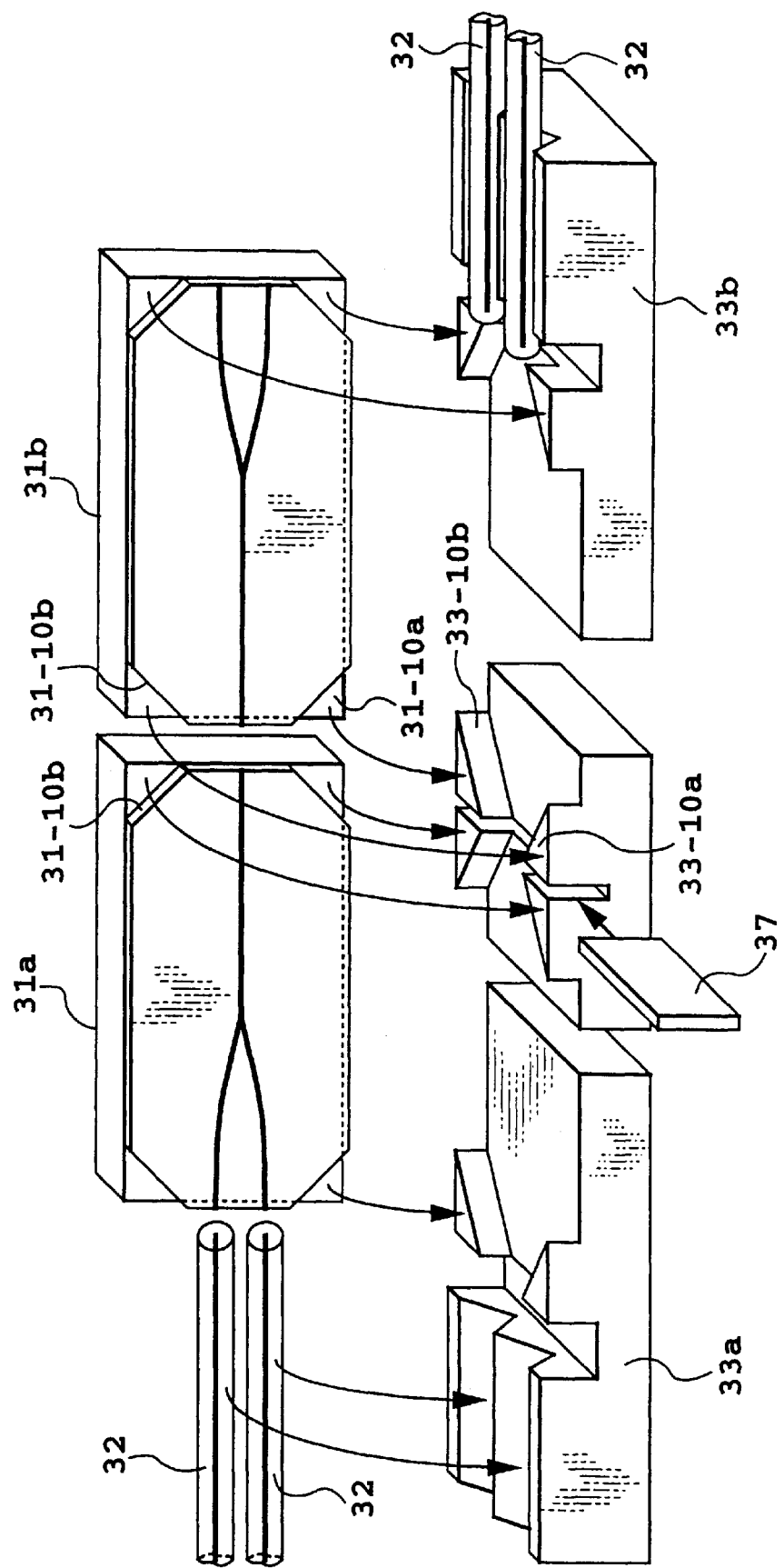
FIG. 24 is an exploded perspective view of an optical module of a tenth embodiment of the present invention, as a view of the optical module characterized by a structure for joining the optical modules together.

FIG. 24 shows the tenth embodiment of the present invention. The difference of this embodiment from Embodiments 8 and 9 is that positioning reference surfaces for a plurality of optical components were provided on a packaging platform.

Concretely, optical fibers 32, and optical components 31-a and 31-b by Y branching optical waveguides were placed on packaging platforms 33-a and 33-b, respectively. Positioning reference surfaces 33-10 for the two piece parts that connected the optical fibers 32 together were provided on the packaging platforms 33. These positioning reference surfaces are matched with positioning reference surfaces 31-10 provided on the optical components 31-a and 31-b, whereby alignment between the optical waveguides provided on both optical components can be realized. This embodiment was also constituted such that the positioning reference surfaces on the packaging platform were formed so that a gap would be formed between both optical components, and a film-shaped component 37 would be inserted into this gap. This film-shaped component 37 was an optical wavelength filter composed of a dielectric multilayer.

In this embodiment, only the site near the junction between the optical components was shown for simplification, so that only the optical waveguide was provided in the optical component. Like Embodiments 8 and 9, however, an electrode pattern and a semiconductor optical device may be placed on the optical component, while an electrical wiring pattern and a depressed portion corresponding to them may be provided on the packaging platform. Furthermore, an optical fiber positioning groove portion for these optical components may be provided.

According to the present invention, as noted above, a plurality of optical components can be combined into a large-scale optical module. In realizing this, alignment between the optical fiber and the optical waveguide, alignment between the optical waveguide and the optical waveguide, alignment between the electrode pattern and the electrical wiring pattern, and alignment between the semiconductor optical device and the depressed portion all can be accomplished by matching between the positioning reference surfaces on the packaging platform and the positioning reference surfaces on the optical component.

Embodiment 11

Figure 25:
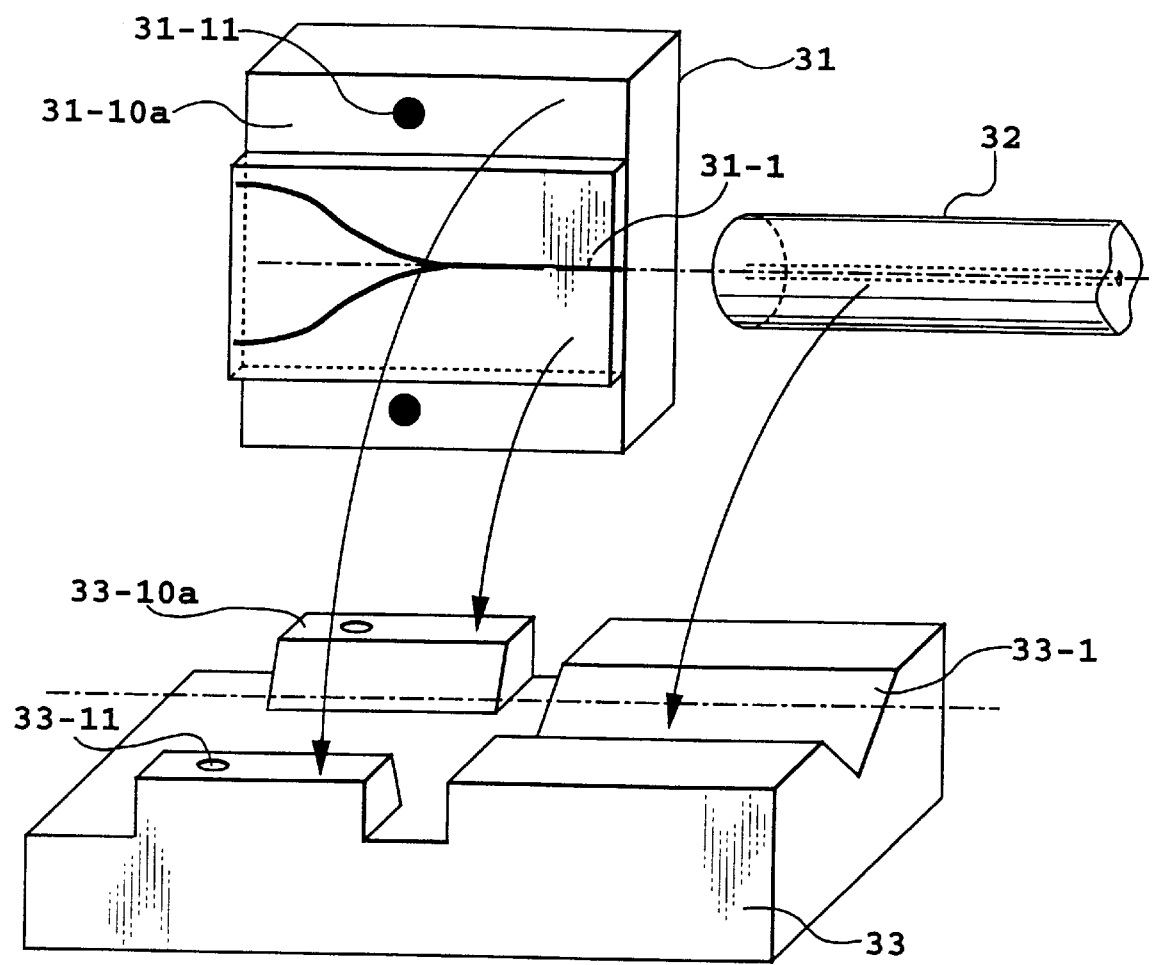
FIG. 25 is an exploded perspective view of an optical module of an eleventh embodiment of the present invention, showing an alignment structure using markers for alignment in the horizontal direction.

In the preceding Embodiments 8 to 10, the horizontal alignment of the optical component and the packaging platform was performed by contact of the horizontal reference surfaces provided in both members. Besides this method, their horizontal alignment can be done using horizontal positioning marks. FIG. 25 illustrates this method, according to which horizontal reference marks (punctate horizontal reference structure portions) 31-11 are formed on height reference surfaces 31-10a of an optical component 31. In a packaging platform 33, too, horizontal reference marks (punctate horizontal reference structure portions) 33-11 are formed on height reference surfaces 33-10a. Here, the horizontal reference marks 33-11 are, say, through-holes. These marks 31-11, 33-11 are optically observed to carry out the alignment of both.

Even if the marks 31-11 and 33-11 are linear, not punctate, in form, they can be used functionally similarly.

In the Embodiments 7 to 11, the material for the packaging platform may be a precision-processable one, and is not restricted to a particular material. For example, the packaging platform may be formed from a material such as silicon or ceramic. However, the packaging platform molded from a resin material among wide varieties of feasible materials is markedly superior in terms of economy and mass producibility. Examples of such resin materials are thermosetting epoxy resins containing 50% of glass powder, and polyetherimide, polysulfone and polyethersulfone resins containing 40% of glass powder.

In the above embodiments, the packaging platform was shaped like a housing of an optical waveguide substrate. In the presence of an alignment structure as shown in the embodiments, however, the packaging platform may be in the form of a substrate extending on a plane.

Embodiment 12

The first characteristic of the present invention lies in a structure in which alignment in optically coupling an optical component and an optical fiber with the use of a packaging platform can be performed accurately and easily. The second characteristic of the invention lies in providing a material constitution for actualizing the first characteristic in an optimal state. The instant Embodiment 12 and following Embodiments 13 to 17 disclose concrete examples of such a material constitution.

Figure 26:
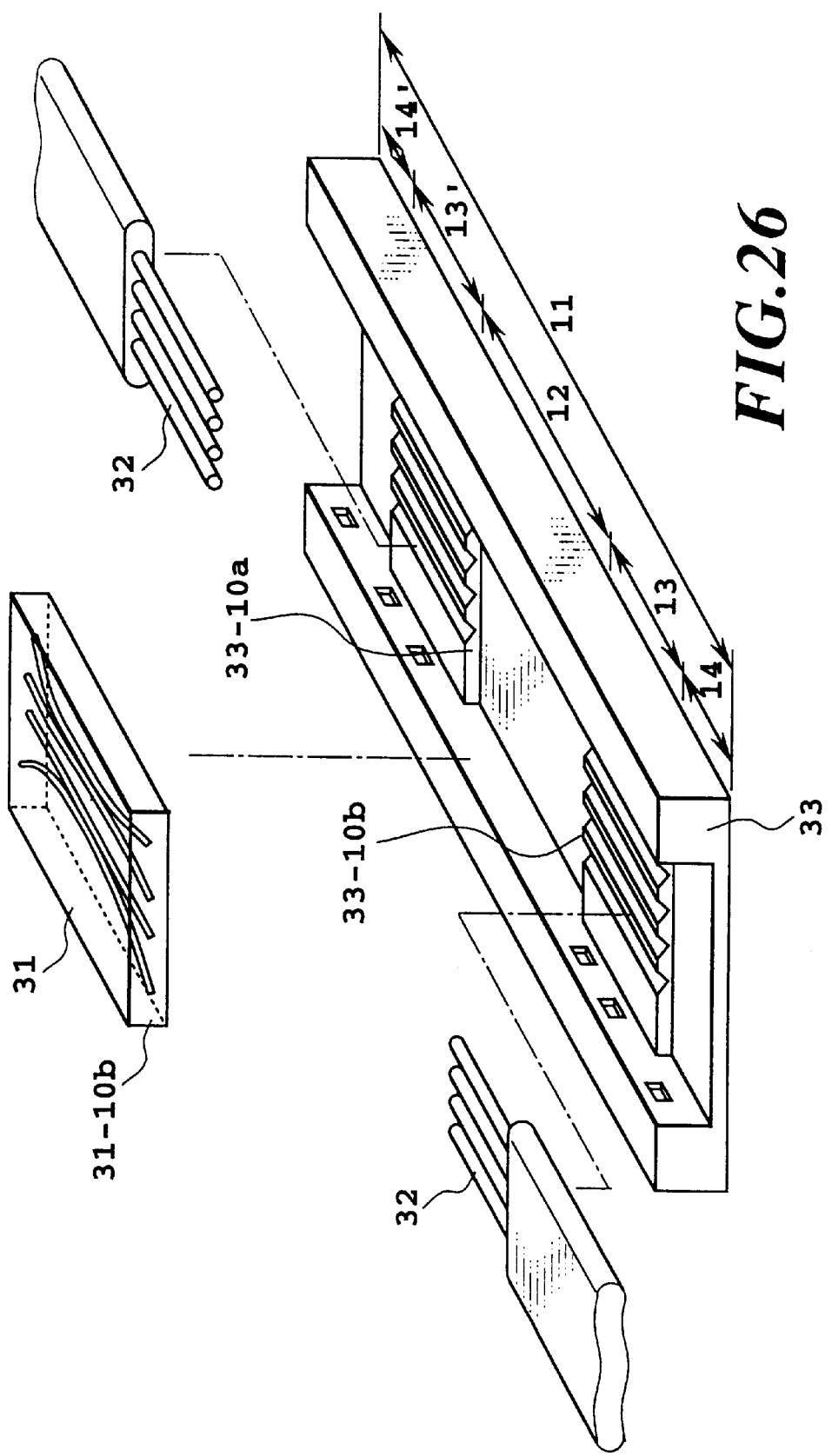
FIG. 26 is a perspective view of a packaging platform as twelfth and sixteenth embodiment of the present invention.

The following is a description of the material constitution and manufacturing method for a packaging platform 33 of a structure as shown in FIG. 26.

The illustrated packaging platform 33 can perform the alignment of a single mode optical waveguide component 31 by the use of two opposed reference surfaces provided in the packaging platform 33 and the single mode optical waveguide component 31. The packaging platform 33 and the optical waveguide component 31 are both precisely formed so that when these opposed reference surfaces are brought into contact with each other, the cores of optical fibers agree with the cores of the single mode optical waveguide component 31. The required accuracy in this case is within ±0.5 micron relative to the target position.

(i) Material

A synthetic resin composition containing 100 parts by weight of a novolak type epoxy resin, 100 parts by weight of a novolak type phenolic resin, 10 parts by weight of a curing promotor (2,4-tolylene diisocyanate, dimethylamine adduct), and 600 parts by weight of silica particles (average particle size 30 microns or less).

(ii) Mold

Quenched steel was precision processed to a dimensional accuracy of ±0.1 micron.

(iii) Molding

The above composition was injection molded in the following manner using the above mold: The composition was fed to an injection molding machine having a clamping pressure of 50 tons, an injection capacity of 49 $cm^3$, a plastication capacity of 25 kg/hr, and an injection pressure of 1,750 kg/$cm^2$, and molded under the conditions, a cylinder temperature of 50° C. below the hopper and 90° C. in the nozzle area, a mold temperature of 180° C., an injection time of 20 seconds, a curing time of 20 seconds, and an injection pressure of 750 kg/$cm^2$. The molded material was post-cured for 3 hours at 180° C.

Figure 27A:
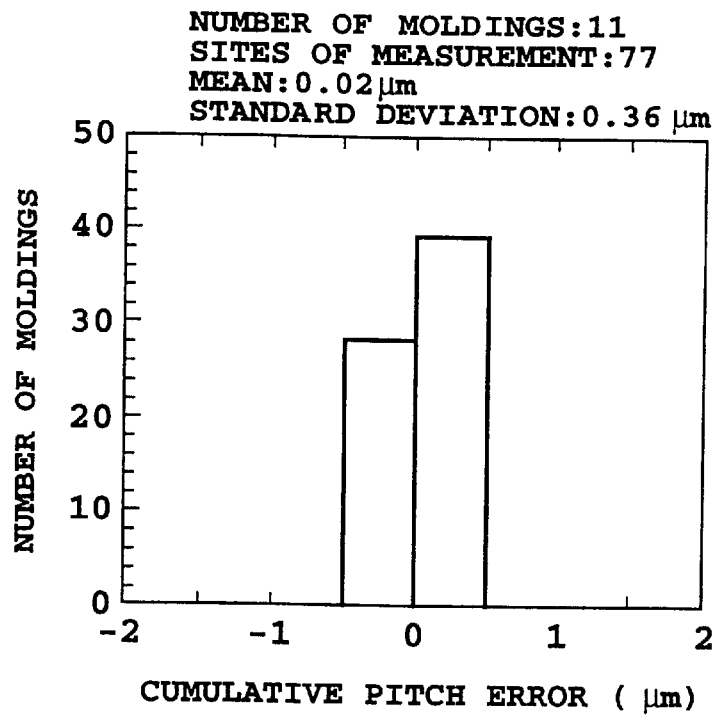
FIGS. 27A and 27B are graphs showing the measurements of the dimension error of the packaging platform for the twelfth embodiment of the present invention.
Figure 27B:
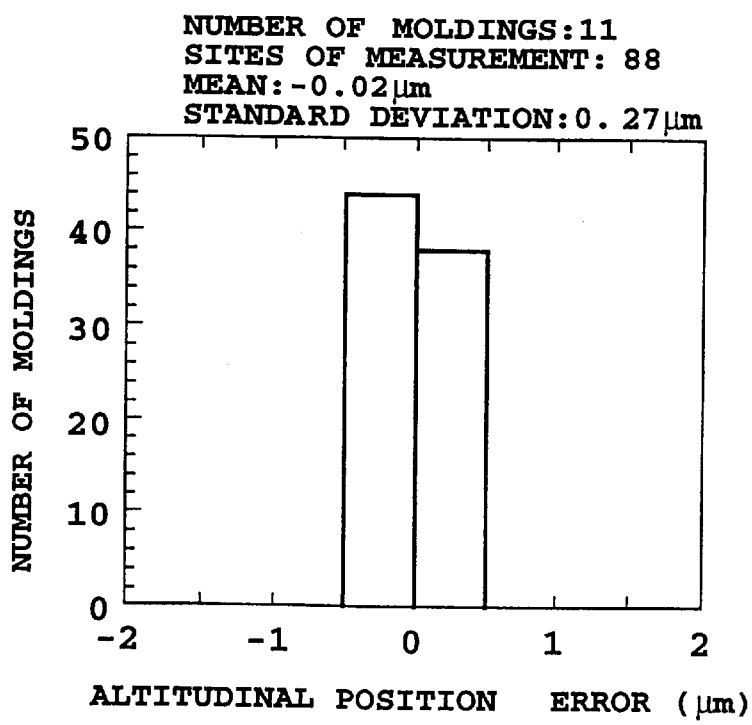

As a result, molded products having a dimensional error of ±0.5 micron as shown in FIGS. 27A and 27B were obtained continuously.

The above-mentioned composition was molded by a transfer molding machine to obtain molded products having the same characteristics.

An optical waveguide component was mounted at a reference surface position of the resulting molded product, and optical fibers polished at the end face were fixed to the optical waveguide component along the V-groove guides. The connection loss was 0.1 dB or less, thus confirming that precise alignment was realized.

Embodiment 13

The following is a description of the material constitution and manufacturing method for a packaging platform 33 of a structure as shown in FIGS. 28A and 28B.

The illustrated packaging platform 33 can perform the alignment of a single mode optical waveguide component 31 by the use of two opposed reference surfaces (a flat surface in the optical waveguide component 31; a surface formed by connecting together the ridgelines 70 of the V-shapes at the bottom of the platform 33 in its sectional view). The packaging platform 33 and the optical waveguide component 31 are both precisely formed so that when these opposed reference surfaces are brought into contact with each other, the cores of optical fibers agree with the cores of the single mode optical waveguide component 31. The required accuracy in this case is within ±0.5 micron relative to the target position.

(i) Material

A synthetic resin composition containing 100 parts by weight of a phenolic novolak type epoxy resin, 100 parts by weight of a novolak type phenolic resin, 10 parts by weight of a curing promotor (2,4-tolylene diisocyanate, dimethylamine adduct), and 600 parts by weight of silica particles (average particle size 30 microns or less).

(ii) Mold

Quenched steel was precision processed to a dimensional accuracy of 10.1 micron.

(iii) Molding

The above composition was injection molded in 20 the following manner using the above mold: The composition was fed to an injection molding machine having a clamping pressure of 50 tons, an injection capacity of 49 $cm^3$, a plastication capacity of 25 kg/hr, and an injection pressure of 1,750 kg/$cm^2$, and molded under the conditions, a cylinder temperature of 50° C. below the hopper and 90° C. in the nozzle area, a mold temperature of 180° C., an injection time of 20 seconds, a curing time of 20 seconds, and an injection pressure of 750 kg/$cm^2$. The molded material was post-cured for 3 hours at 180° C.

As a result, molded products having a dimensional error of ±0.5 micron as shown in FIGS. 28A and 28B were obtained continuously.

The above-mentioned composition was molded by a transfer molding machine to obtain molded products having the same characteristics.

An optical waveguide component was mounted at a reference surface position of the resulting molded product, and optical fibers polished at the end face were fixed to the optical waveguide component along the V-groove guides. The connection loss was 0.1 dB or less, thus confirming that precise alignment was realized.

Embodiment 14

Figures 30A, 30B:
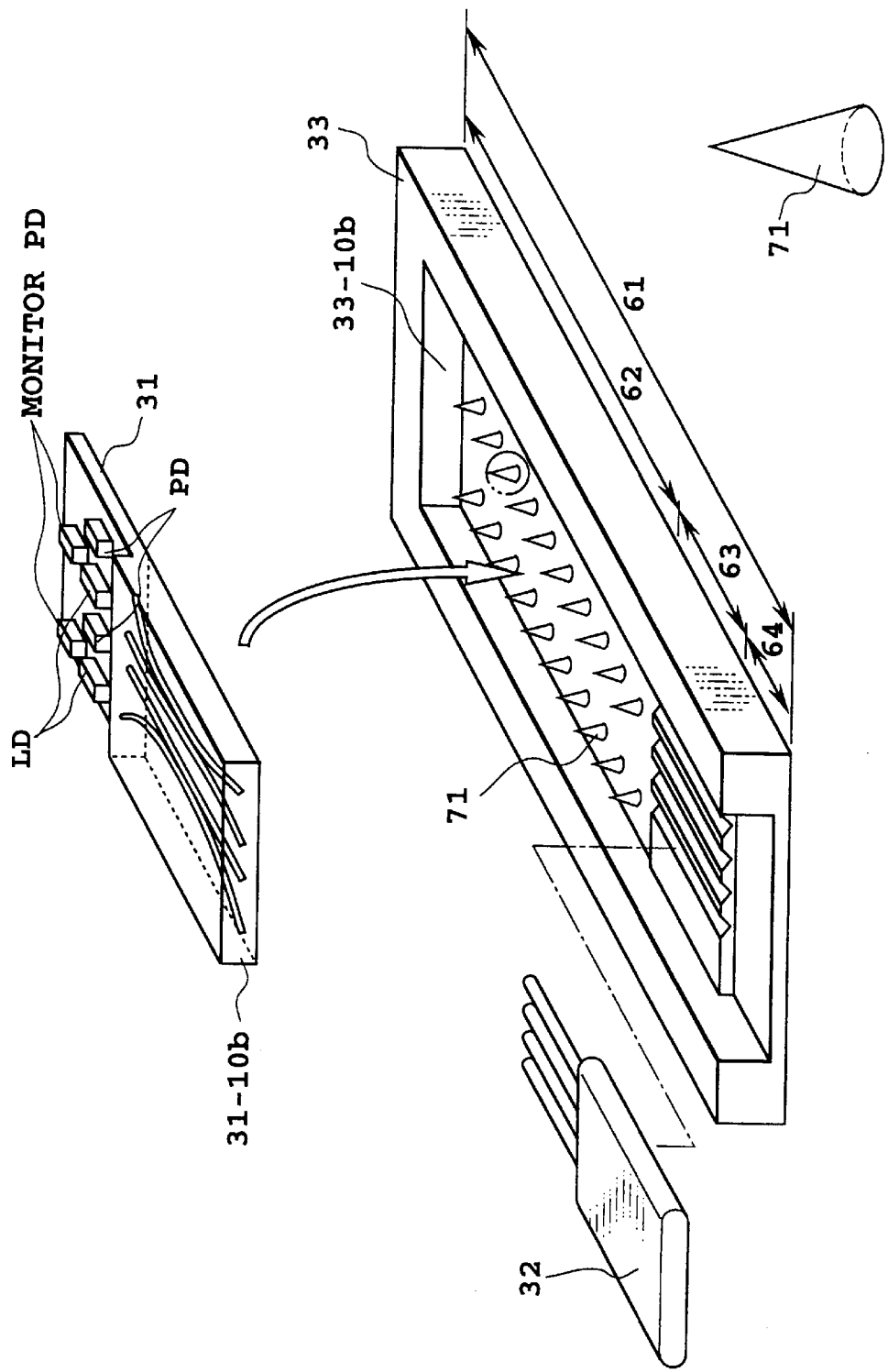
FIG. 30A is a perspective view of a packaging platform for a fourteenth embodiment of the present invention.
FIG. 30B is a perspective view of a conical shape in the platform illustrated in FIG. 30A.

The following is a description of the material constitution and manufacturing method for a packaging platform 33 of a structure as shown in FIGS. 30A and 30B.

The illustrated packaging platform 33 can perform the alignment of a single mode optical waveguide component 31 by the use of two opposed reference surfaces (a flat surface in the optical waveguide component 31; a surface formed by connecting together the apices of conical shapes 71 in the platform 33). The packaging platform 33 and the optical waveguide component 31 are both precisely formed so that when these opposed reference surfaces are brought into contact with each other, the cores of optical fibers agree with the cores of the single mode optical waveguide component 31. The required accuracy in this case is within ±0.5 micron relative to the target position.

(i) Material

A synthetic resin composition containing 100 parts by weight of a phenolic novolak type epoxy resin, 100 parts by weight of a novolak type phenolic resin, 10 parts by weight of a curing promotor (2,4-tolylene diisocyanate, dimethylamine adduct), and 600 parts by weight of silica particles (average particle size 30 microns or less).

(ii) Mold

Quenched steel was precision processed to a dimensional accuracy of ±0.1 micron.

(iii) Molding

The above composition was injection molded in the following manner using the above mold: The composition was fed to an injection molding machine having a clamping pressure of 50 tons, an injection capacity of 49 $cm^3$, a plastication capacity of 25 kg/hr, and an injection pressure of 1,750 kg/$cm^2$, and molded under the conditions, a cylinder temperature of 50° C. below the hopper and 90° C. in the nozzle area, a mold temperature of 180° C., an injection time of 20 seconds, a curing time of 20 seconds, and an injection pressure of 750 kg/$cm^2$. The molded material was post-cured for 3 hours at 180° C.

Figure 29A:
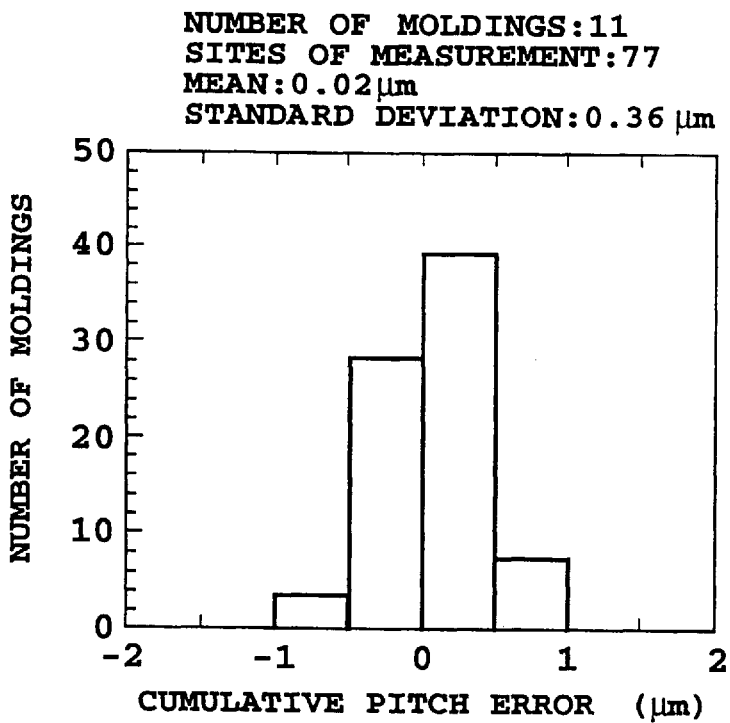
FIGS. 29A and 29B are graphs showing the measurements of the dimensional error of the packaging platform for the thirteenth embodiment of the present invention.
Figure 29B:
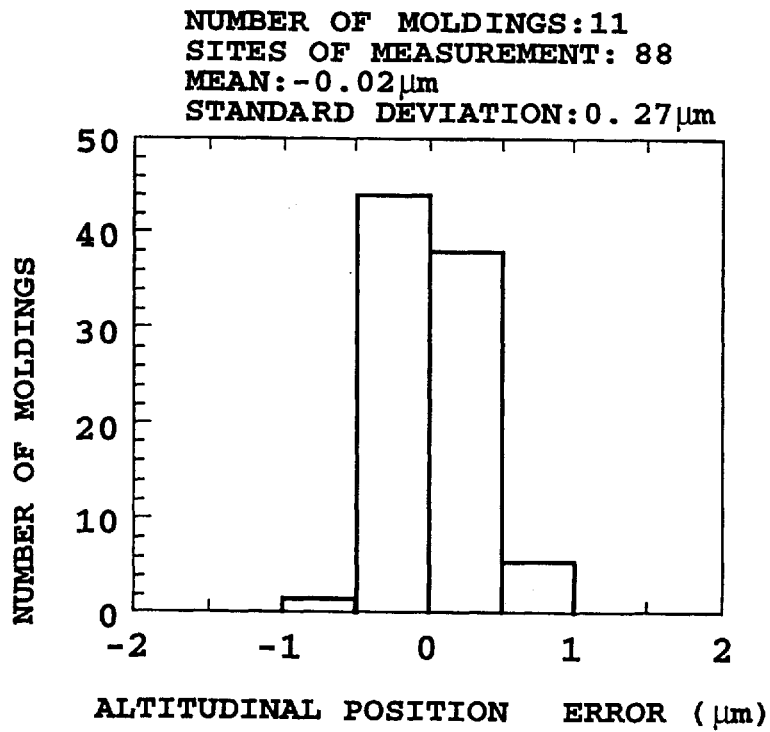

As a result, molded products having a dimensional error of ±0.5 micron as shown in FIG. 29 were obtained continuously.

The above-mentioned composition was molded by a transfer molding machine to obtain molded products having the same characteristics.

An optical waveguide component was mounted at a reference surface position of the resulting molded product, and optical fibers polished at the end face were fixed to the optical waveguide component along the V-groove guides. The connection loss was 0.1 dB or less, thus confirming that precise alignment was realized.

Embodiment 15

Figure 31:
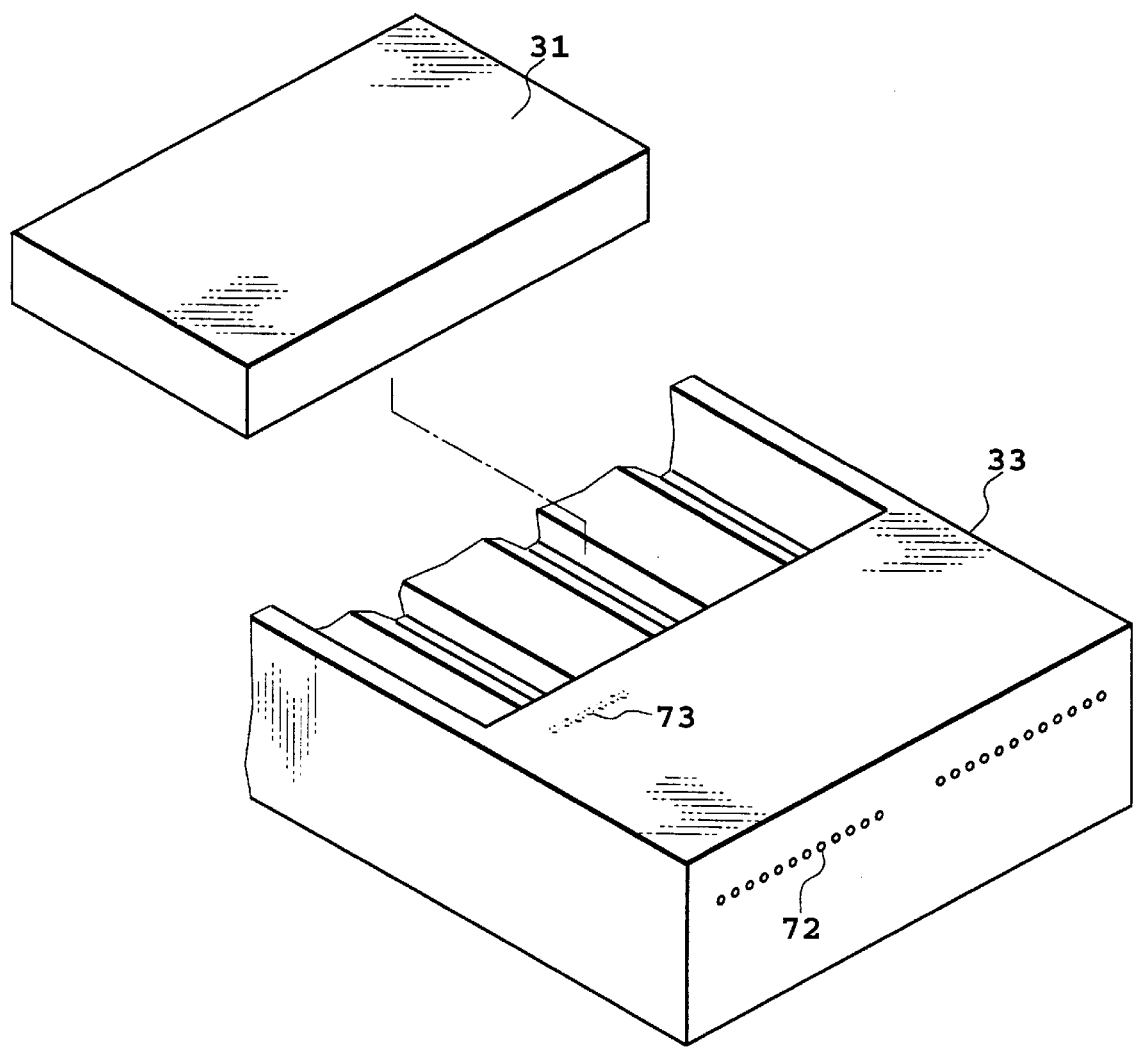
FIG. 31 is perspective view of a packaging platform for a fifteenth embodiment of the present invention.

The following is a description of the material constitution and manufacturing method for a packaging platform 33 of a structure as shown in FIG. 31.

The illustrated packaging platform 33 can perform the alignment of a single mode optical waveguide component 31 by the use of two opposed reference surfaces provided in the packaging platform 33 and the single mode optical waveguide component 31. The packaging platform 33 and the optical waveguide component 31 are both precisely formed so that when these opposed reference surfaces are brought into contact with each other, the cores of optical fibers agree with the cores of the single mode optical waveguide component 31. The required accuracy in this case is within ±0.5 micron relative to the target position. The diameter of each of cylinders 72 as inputs for optical fibers was set at 200 microns, while the diameter of each of cylinders 73 on the alignment side was set at 126 microns.

The molding method for the packaging platform complied with the aforementioned Embodiment 12. As a result, molded products having a dimensional error of ±0.5 micron relative to the target value were obtained continuously.

The aforementioned composition was molded by a transfer molding machine to obtain molded products having the same characteristics.

An optical waveguide component was mounted at a reference surface position of the resulting molded product, and optical fibers (125 microns in diameter) polished at the end face were fixed to the optical waveguide component along the cylindrical guides. The connection loss was 0.1 dB or less, thus confirming that precise alignment was realized.

Embodiment 16

The following is a description of the material constitution and manufacturing method for a packaging platform 33 of a structure as shown in FIG. 26.

The illustrated packaging platform 33 can perform the alignment of a single mode optical waveguide component 31 by the use of two opposed reference surfaces provided in the packaging platform 33 and the single mode optical waveguide component 31. The packaging platform 33 and the optical waveguide component 31 are both precisely formed so that when these opposed reference surfaces are brought into contact with each other, the cores of optical fibers agree with the cores of the single mode optical waveguide component 31. The required accuracy in this case is within ±1 micron relative to the target position.

(i) Material

A synthetic resin composition containing 100 parts by weight of a novolak type epoxy resin, 100 parts by weight of a novolak type phenolic resin, 10 parts by weight of a curing promotor (2,4-tolylene diisocyanate, dimethylamine adduct), and silica particles (average particle size 30 microns or less) in a varying proportion as shown in Table 3.

TABLE 3

| Silica (% wt/wt) | Mold shrinkage | V-groove pitch dimensional error |
| --- | --- | --- |
| 30 | 0.4% | $-1 \mu m < < 0 \mu m$ |
| 50 | 0.3% | $-1 \mu m < < 0.5 \mu m$ |
| 70 | 0.2% | $< \pm 0.5 \mu m$ |

(ii) Mold

Quenched steel was precision processed to a dimensional accuracy of ±0.1 micron.

(iii) Molding

The above composition was injection molded in the following manner using the above mold: The composition was fed to an injection molding machine having a clamping pressure of 50 tons, an injection capacity of 49 cm$^3$, a plastication capacity of 25 kg/hr, and an injection pressure of 1,750 kg/$cm^2$, and molded under the conditions, a cylinder temperature of 50° C. below the hopper and 90° C. in the nozzle area, a mold temperature of 180° C., an injection time of 20 seconds, a curing time of 20 seconds, and an injection pressure of 750 kg/$cm^2$. The molded material was post-cured for 3 hours at 180° C.

As a result, molded products having a dimensional error of ±0.5 micron as shown in FIG. 27 were obtained continuously.

The above-mentioned composition was molded by a transfer molding machine to obtain molded products having the same characteristics.

An optical waveguide component was mounted at a reference surface position of the resulting molded product, and optical fibers polished at the end face were fixed to the optical waveguide component along the V-groove guides. The connection loss was 0.1 dB or less, thus confirming that precise alignment was realized.

Control 1

In Embodiment 16, the synthetic resin composition with the silica powder proportion varied as shown in Table 4 was molded. The shrinkage of the resulting molded product was 1.3%, demonstrating that no products having satisfactory dimensional accuracy were obtained. Variations in the dimensional values were also great (5 to 6 microns).

TABLE 4

| Silica (% wt/wt) | Mold shrinkage | V-groove pitch dimensional error |
| --- | --- | --- |
| 0 | 1.3% | $-5 \mu m < < -9 \mu m$ |
| 10 | 1.3% | $-5 \mu m < < -10 \mu m$ |

Control 2

The following is a description of the material constitution and manufacturing method for a packaging platform 33 of a structure as shown in FIG. 26.

The illustrated packaging platform 33 can perform the alignment of a single mode optical waveguide component 31 by the use of two opposed reference surfaces provided in the packaging platform 33 and the single mode optical waveguide component 31. The packaging platform 33 and the optical waveguide component 31 are both precisely formed so that when these opposed reference surfaces are brought into contact with each other, the cores of optical fibers agree with the cores of the single mode optical waveguide component 31. The required accuracy in this case is within ±1 micron relative to the target position.

(i) Material

A synthetic resin containing silica particles (average particle size 30 microns or less) in a varying proportion as shown in Table 5 based on polyetherimide resin.

TABLE 5

| Silica (% wt/wt) | Anisotropy | Dimensional error | Remarks |
|---|---|---|---|
| 0 | 1.7 | — | Warping confirmed visually |
| 30 | 1.3 | ± <1 μm | |

(ii) Mold

Quenched steel was precision processed to a dimensional accuracy of ±0.1 micron.

(iii) Molding

The above composition was injection molded using the above mold under the same conditions as described in the aforementioned embodiments.

It turned out that the materials with high anisotropy as shown in Table 5 did not give satisfactory molded products.

Embodiment 17

Figure 32:
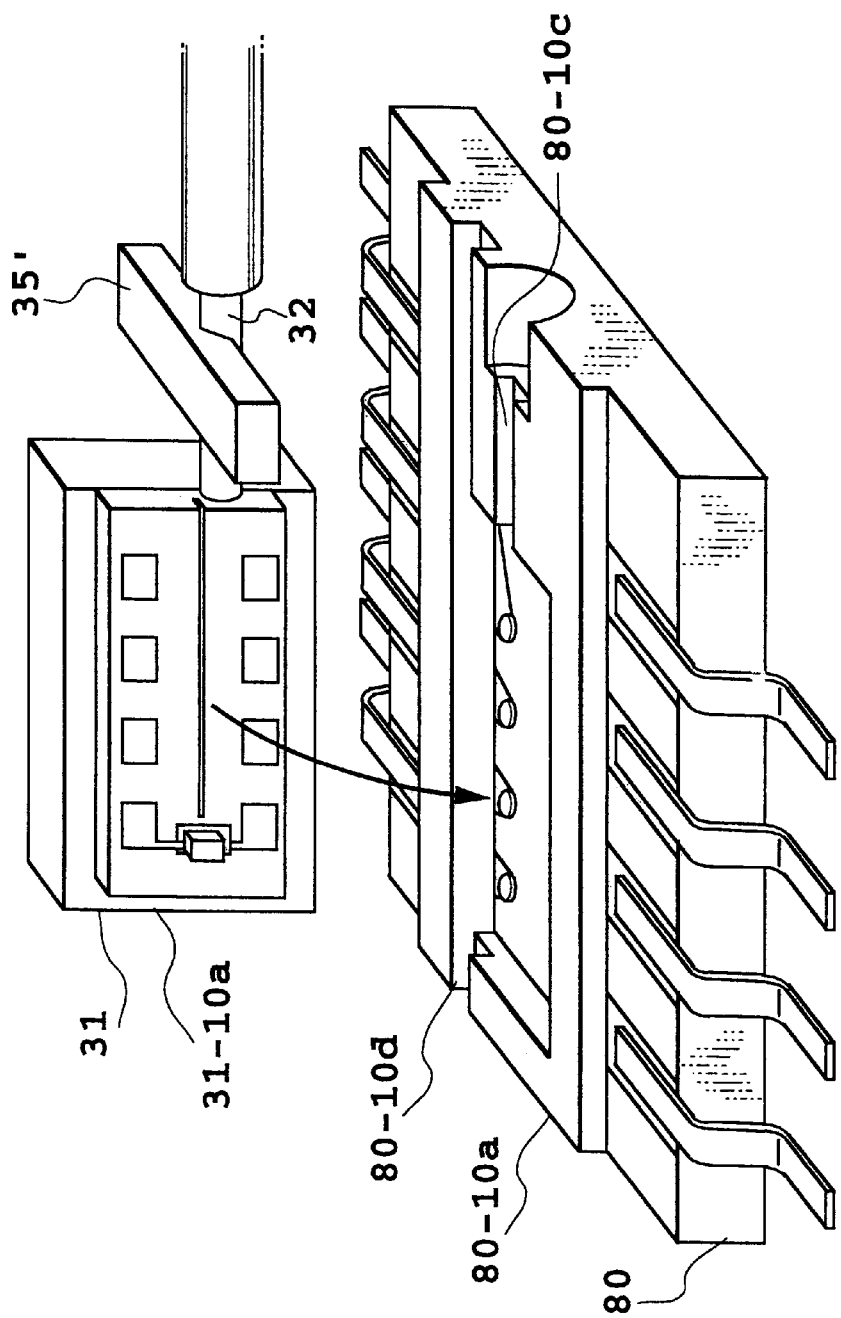
FIG. 32 is a perspective view of a packaging platform as a seventeenth embodiment of the present invention using a ceramic as a material.
Figure 33:
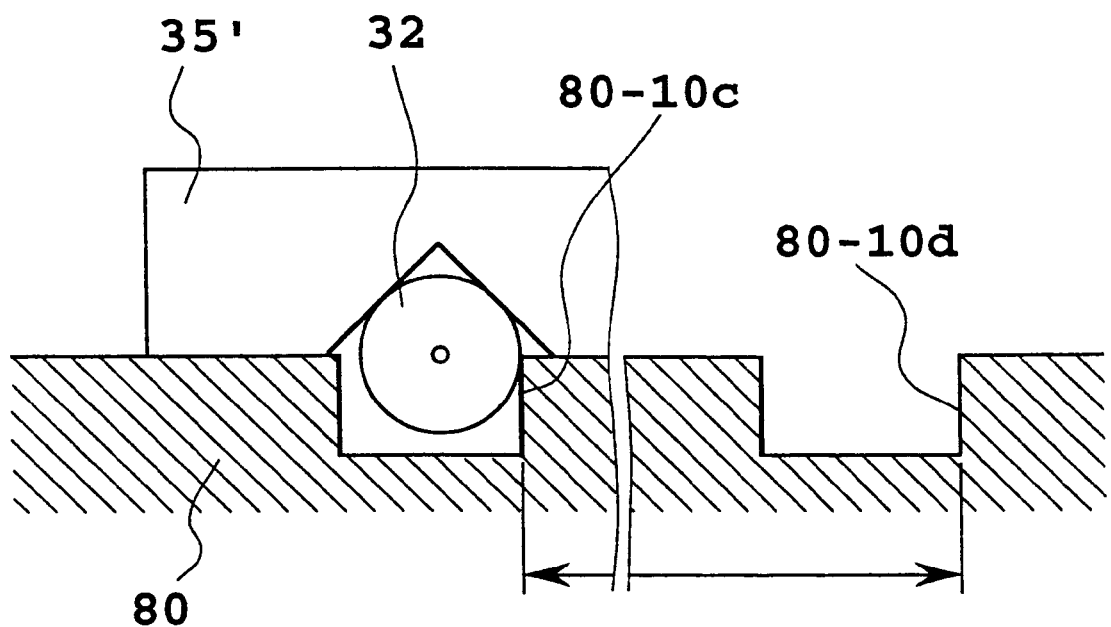
FIG. 33 is a sectional structural view of the essential part of the platform shown in FIG. 29.

FIGS. 32 and 33 shown an example of a packaging platform 80 using ceramic. The constitution of an optical module was almost the same as in FIGS. 12 and 19. When ceramic was used, the structure of the lead and the alignment structure differed.

In a packaging platform using resin, the lead portion was composed of a lead frame. With ceramic, a burning step was involved. Thus, a high melting point metal such as tungsten was patterned and embedded. This pattern was gold plated, and then brazed to the lead.

The alignment structure was worked out in consideration of a deviation from the mold due to deformation during sintering. Only an alignment reference surface 80-10a for alignment in the height direction was the surface as sintered. The reason is as follows: The main cause of deformation during ceramic sintering is shrinkage during sintering. The height-direction alignment reference surface of the packaging platform, if deformed, changes uniformly and can be used as a reference surface. Whereas a wall surface 80-10c, as a reference surface for alignment in the transverse direction, is located at a site apart from an optical waveguide component 31 and an optical fiber 32. This distance varies after sintering. Thus, a vertical wall surface 80-10d prepared by a precision dicing saw whose precision feeding was controllable was used as a reference surface for optical axis alignment in the transverse direction.

Alignment using these positioning reference surfaces of the packaging platform 80 is described below.

Alignment in the height direction was performed upon contact of these reference surfaces with a height reference surface 31-10a of the optical waveguide component 31 and the surface of a V-groove substrate 35' attached to the optical fiber 32. The V-groove was formed by precision processing using the anisotropic etching of Si. Thus, the distance from the height reference surface of the optical waveguide component 31 was brought into agreement with the distance of the optical fiber core from the surface of the V-groove substrate 35' made of Si.

Alignment in the transverse direction was performed by pressing a cladding wall surface, which was a transverse reference surface of the waveguide component 31, and a projecting side surface of the optical fiber 32 (projecting from the V-groove substrate 35') against the wall surface 80-10c formed by the above-mentioned dicing. A deviation of about several microns to 20 microns in the position of dicing would pose no problem. Of importance here would be the pitch of dicing. If this pitch is determined, precise alignment would become possible, because the distance from the transverse reference surface of the optical waveguide to the core of the optical waveguide, and the distance from the side surface of the optical fiber to the optical fiber core have been accurately determined. The pitch of dicing can be controlled to about 1 micron.

As described above, the packaging platform of the present invention is a packaging platform for achieving optical coupling of an optical fiber to an optical waveguide of an optical component having the optical waveguide and an electrode pattern formed on the surface of the optical waveguide; the packaging platform including a planar, linear or punctate reference structure portion for performing the horizontal and vertical positioning of the optical component, and a fiber positioning portion for inserting and holding the optical fiber and positioning the optical fiber at a position where the optical fiber is optically connected to the optical waveguide of the optical component, and also including an electrical wiring pattern provided at a position opposed to one or more electrode pads of the electrode pattern on the optical component. Furthermore, a depressed portion may be provided at a position on the packaging platform opposed to an optical device carried on the optical component. Because of this constitution, the packaging platform of the invention has all of an optical fiber connecting function, an electrically connecting function, and a sealing function with an appropriate sealing material. Hence, the use of the packaging platform of the invention can markedly cut down on the number of the constituents of an optical module, thus enabling a low cost optical module to be produced.

According to the invention, moreover, the packaging platform is combined with an optical component which has on its surface a positioning reference surface corresponding to a positioning reference surface of the packaging platform, and also has an optical waveguide, an electrode pattern and an optical device manufactured so that their positions and distances from the positioning reference surface will agree with those of the packaging platform. Thus, simply by registering the positioning mechanisms of the packaging platform and the optical component, the alignment on the three factors, fiber connection, electrical connection, and sealing, can be completed simultaneously and very easily.

As noted from this, the invention simplifies the manufacturing procedure for an optical module, thus permitting a low cost optical module to be realized.

Furthermore, the invention uses a resin molded product as a packaging platform, and employs for the usable resin a concrete resin composition as disclosed in the Embodiments of the invention. Thus, high dimensional accuracy of the order of submicrons, heat resistance, and long-term reliability can be achieved. In addition, the packaging platform is composed of resin, so that its mass production by molding becomes possible, markedly reducing the manufacturing cost.

The present invention has been described in detail with respect to preferred embodiments, and it will now be apparent from the foregoing to those skilled in the art that changes and modifications may be made without departing from the invention in its broader aspect. The invention, therefore, covers all such changes and modifications as fall within the true spirit thereof.

What is claimed is:

1. An optical module comprising:
   an optical component including
      an optical waveguide having core and clad portions;
      an electrode pattern having a plurality of electrode pads; and
      a first alignment guide having
         a first height reference surface separated by a predetermined height from the core portion of said optical waveguide and positioned along a section thereof; and
         a first horizontal reference surface separated by a predetermined distance from the core portion of said optical waveguide; and
   a packaging platform having
      a fiber positioning portion for receiving and holding an optical fiber;
      an electrical wiring pattern; and
      a second alignment guide having
         a second height reference surface, said first and second height reference surfaces determining the vertical position of said optical component on said platform when said optical component and said packaging platform are brought into contact with each other; and
         a second horizontal reference surface, said first and second horizontal reference surfaces determining the horizontal position of said optical component on said platform when said optical component and said packaging platform are brought into contact with each other; whereby
      when said optical component and said packaging platform are brought into contact with each other the electrode pads of said electrode pattern and the electrical wiring pattern are brought into alignment with each other, and the optical fiber inserted into the fiber positioning portion of said packaging platform and said optical waveguide are coupled.

2. An optical module as claimed in claim 1, wherein an optical device is optically connected to said optical waveguide, and wherein said packaging platform is further provided with a depressed portion at a position opposed to said optical device when the optical component is positioned so as to couple the optical fiber to the optical waveguide.

3. An optical module as claimed in claim 2, wherein sealing of the optical device is achieved by filling an insulating and transparent resin into the depressed portion.

4. An optical module as claimed in claim 1, further comprising a plurality of optical components, and wherein said packaging platform is further provided with additional alignment guides for horizontal and vertical positioning of the optical components relative to one another.

5. An optical module as claimed in claim 1, wherein said first horizontal reference surface is a wall surface etched into a cladding portion of said optical waveguide.

6. An optical module as claimed in claim 1, wherein said first height reference surface is an exposed substrate surface formed when the cladding portion of said optical waveguide is removed to expose the substrate surface.

7. An optical module as claimed in claim 1, wherein said first horizontal reference surface of the first alignment guide comprises a pair of engagement surfaces formed obliquely in the cladding portion of said optical waveguide in the longitudinal direction thereof, and said second horizontal reference surface of the second alignment guide comprises a pair of engagement surfaces for contacting the pair of engagement surfaces of the first alignment guide.

8. An optical module as claimed in claim 7, wherein the pair of engagement surfaces of the first alignment guide are placed at linearly symmetric positions with respect to an axis parallel to an optical axis of exit light from the optical waveguide.

9. An optical module as claimed in claim 1, wherein an insulating sealing resin fills a gap between the optical component and the packaging platform.

10. An optical module as claimed in claim 9, wherein the penetration of the resin into a specific portion is inhibited by adjusting the size of the gap between the optical component and the packaging platform.

11. An optical module as claimed in claim 1, wherein the packaging platform is composed of a synthetic resin composition.

12. An optical module as claimed in claim 11, wherein the mold shrinkage coefficient of the synthetic resin composition is not more than 1%, and the shrinkage coefficient is isotropic or the ratio of its maximum value to its minimum value is not more than 1.5.

13. An optical module as claimed in claim 12, wherein the synthetic resin composition consists essentially of a thermosetting resin and contains an inorganic filler.

14. An optical module as claimed in claim 13, wherein the thermosetting resin is an epoxy resin.

15. An optical module as claimed in claim 14, wherein the inorganic filler is a silica powder.

16. An optical module as claimed in claim 11, wherein the synthetic resin composition consists essentially of an amorphous polymer and contains an inorganic filler.

17. An optical module as claimed in claim 16, wherein the inorganic filler is an inorganic crystalline powder, or an inorganic glass powder, or a mixture of these.

18. An optical module as claimed in claim 16, wherein the amorphous polymer is polyethersulfone, polysulfone, polyetherimide, or a mixture of these.

19. An optical module as claimed in claim 1, wherein the packaging platform is formed of ceramic.

20. An optical module as claimed in claim 1, wherein the fiber positioning portion is V-shaped in cross section.

21. An optical module as claimed in claim 1, wherein the fiber positioning portion is cylindrical in cross section.

22. An optical module as claimed in claim 1, wherein an insertion/removal structure for making the optical fiber insertible and removable is formed in the fiber positioning portion.

23. A method for producing the optical module of claim 1, comprising the steps of:
   packaging the optical component on the platform;
   connecting the optical fiber to the optical component; and
      sealing an upper part or the whole of the platform with a resin mold.

* * * * *